(12) United States Patent
Kunsberg

(10) Patent No.: US 11,082,755 B2
(45) Date of Patent: Aug. 3, 2021

(54) BEAT BASED EDITING

(71) Applicant: Adam Kunsberg, Laguna Niguel, CA (US)

(72) Inventor: Adam Kunsberg, Laguna Niguel, CA (US)

(*) Notice: Subject to any disclaimer, the term of this patent is extended or adjusted under 35 U.S.C. 154(b) by 0 days.

(21) Appl. No.: 17/024,122

(22) Filed: Sep. 17, 2020

(65) Prior Publication Data

US 2021/0084388 A1 Mar. 18, 2021

Related U.S. Application Data

(60) Provisional application No. 62/901,931, filed on Sep. 18, 2019.

(51) Int. Cl.
*H04N 21/845* (2011.01)
*G06F 16/738* (2019.01)
*H04N 21/4402* (2011.01)

(52) U.S. Cl.
CPC ....... *H04N 21/8456* (2013.01); *G06F 16/739* (2019.01); *H04N 21/440245* (2013.01)

(58) Field of Classification Search
CPC ........ H04N 21/8456; H04N 21/440245; G06F 16/739
See application file for complete search history.

(56) References Cited

U.S. PATENT DOCUMENTS

| | | | | |
|---|---|---|---|---|
| 5,963,203 A * | 10/1999 | Goldberg | ............. | G11B 27/034 715/723 |
| 6,573,907 B1 * | 6/2003 | Madrane | ............. | G11B 27/034 715/719 |
| 8,321,905 B1 * | 11/2012 | Streeter | ............. | H04N 21/4384 725/134 |
| 8,532,171 B1 * | 9/2013 | Narayanan | ......... | H04N 21/2187 375/240.01 |
| 8,666,195 B1 * | 3/2014 | Mierle | ................ | G06K 9/6203 382/295 |
| 10,334,328 B1 * | 6/2019 | Rosen | .................... | G06N 20/00 |
| 2002/0140719 A1 * | 10/2002 | Amir | .................. | H04N 21/8549 715/716 |

(Continued)

FOREIGN PATENT DOCUMENTS

| | | | | |
|---|---|---|---|---|
| WO | WO-02052565 A1 * | 7/2002 | ............ | G11B 27/034 |
| WO | WO-2008109233 A1 * | 9/2008 | ............. | G06F 16/40 |

*Primary Examiner* — James R Sheleheda
(74) *Attorney, Agent, or Firm* — Hickman Becker Bingham Ledesma LLP

(57) ABSTRACT

Beat based editing techniques are disclosed to divide a story into a series of story moments or beats, and to use beats as a basis of editing, playback and interactivity. In an embodiment, interacting with the computer-implemented process of the present disclosure, an editor can edit and modify the parameters of each beat, adding and adjusting sound, video, music, or interactivity. When footage is captured, it may be segmented into corresponding beats, and each footage beat may then be used in the editor's arrangement of story beats. Each beat is played back according to the editor's arrangement, interactive logic, or other software. In this manner, a process of beat based editing is disclosed. Various embodiments provide an editor, a nodal network, a player/viewer, and a metadata format.

20 Claims, 20 Drawing Sheets

(56) References Cited

U.S. PATENT DOCUMENTS

| | | | |
|---|---|---|---|
| 2008/0288913 A1* | 11/2008 | Creighton | G06F 8/10 717/100 |
| 2010/0043040 A1* | 2/2010 | Olsen, Jr. | H04N 21/44012 725/110 |
| 2010/0293190 A1* | 11/2010 | Kaiser | H04N 21/4312 707/769 |
| 2011/0126106 A1* | 5/2011 | Ben Shaul | A63J 25/00 715/723 |
| 2013/0177294 A1* | 7/2013 | Kennberg | H04N 21/816 386/241 |
| 2014/0019865 A1* | 1/2014 | Shah | H04N 21/8545 715/731 |
| 2014/0133834 A1* | 5/2014 | Shannon | H04N 5/232945 386/278 |
| 2014/0233919 A1* | 8/2014 | Sabatino | G11B 27/034 386/285 |
| 2016/0104513 A1* | 4/2016 | Bloch | G11B 27/031 715/720 |
| 2016/0136524 A1* | 5/2016 | Leites | A63F 13/47 463/29 |
| 2016/0162244 A1* | 6/2016 | Christmas | H04N 21/4312 345/1.3 |
| 2016/0196044 A1* | 7/2016 | McGill | H04N 5/262 715/720 |
| 2016/0248526 A1* | 8/2016 | Wang | G11B 27/22 |
| 2016/0381436 A1* | 12/2016 | Yu | H04N 21/2187 725/19 |
| 2018/0336930 A1* | 11/2018 | Takahashi | G11B 27/10 |
| 2019/0034213 A1* | 1/2019 | Zweig | G06F 16/43 |
| 2019/0244639 A1* | 8/2019 | Benedetto | G11B 27/036 |
| 2020/0051302 A1* | 2/2020 | Subramonyam | G11B 27/031 |
| 2020/0099913 A1* | 3/2020 | Godar | H04N 19/177 |
| 2020/0143839 A1* | 5/2020 | Vaucher | G11B 27/036 |
| 2020/0201904 A1* | 6/2020 | Hypen | G06F 16/739 |
| 2020/0243116 A1* | 7/2020 | Lee | H04N 21/47205 |
| 2020/0314468 A1* | 10/2020 | Kahler | H04N 21/233 |
| 2020/0335133 A1* | 10/2020 | Vaucher | H04N 21/854 |
| 2020/0372671 A1* | 11/2020 | Walker | G06T 7/55 |
| 2020/0374422 A1* | 11/2020 | Takada | H04N 5/262 |

* cited by examiner

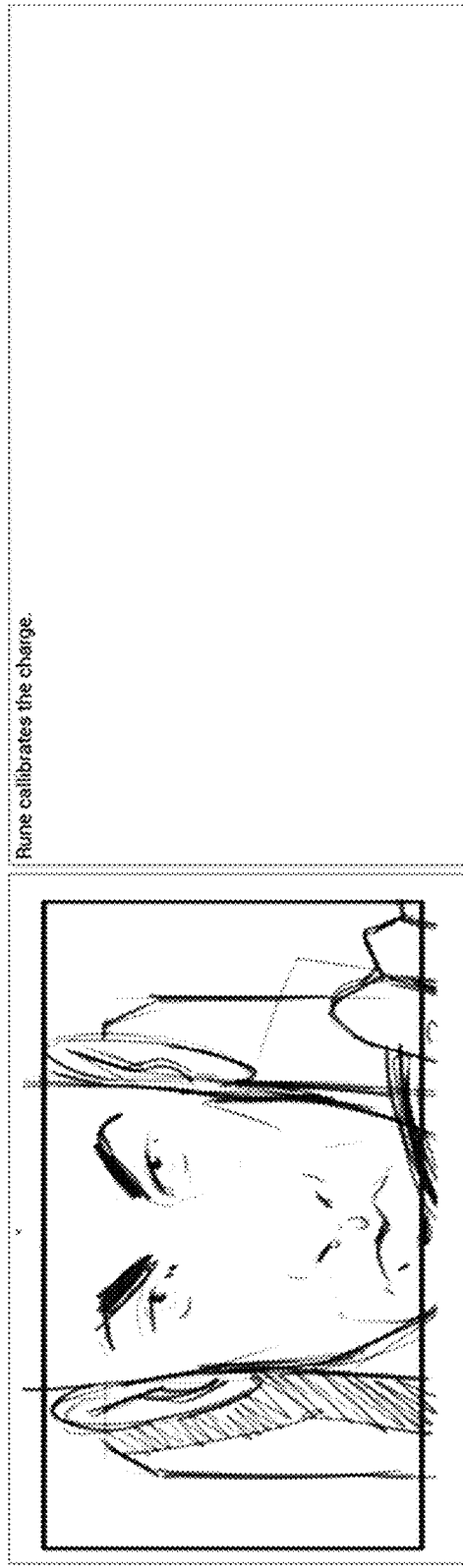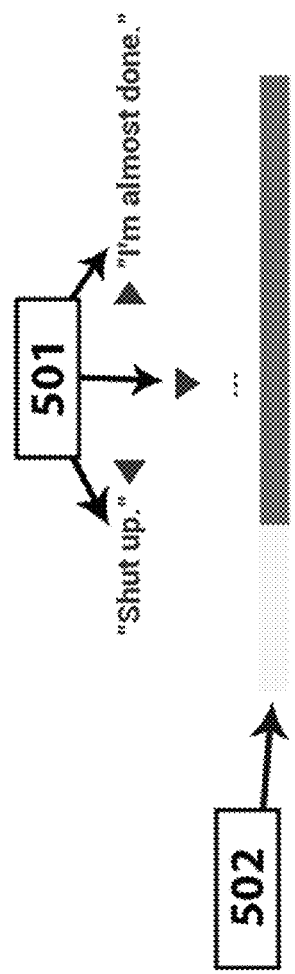
FIG. 5

FIG. 10

FIG. 11 – Beat Based Production

BEAT BASED EDITING

BENEFIT CLAIM

This application claims the benefit of Provisional Appln. 62/901,931, filed Sep. 18, 2019, the entire contents of which are hereby incorporated by reference as if fully set forth herein, under 35 U.S.C. § 119(e).

FIELD OF THE DISCLOSURE

One technical field of the present disclosure is computer-implemented editing of digital media such as motion pictures, television programs and computer games.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

In traditional editing, the editor uses timecode IN and OUT points to determine when and for how long each piece of footage should be played. This means that each performance must be manually given unique IN and OUT points, greatly increasing the amount of time it takes to interchange different performances. This also means that an edit is linear and cannot be dynamically modified during playback.

For example, "Cut to the wide shot after he hangs up the phone," is the sort of thing a director would say during a film editing session. While it is simple enough for a human to understand, it must be translated into a list of clips with timecodes in order for a machine to accomplish it. A simple direction like the one above would require the editor to personally conduct a visual search for the proper "Wide Shot"; conduct a visual search for the moment when the actor is hanging up the phone in the currently used clip; conduct a visual search for the moment when the actor is hanging up the phone in the new "Wide Shot" clip and mark it with an IN point using timecode; find a suitable OUT point also using timecode and create a marker for it as well; and insert that shot into the timeline. If the director decides to use a different shot or take of this moment, the editor must repeat this process. Consequently, existing editing processes are tedious, time-consuming and inefficient in terms of using processor, memory, storage and other computer resources.

SUMMARY

The appended claims may serve as a summary of the invention.

BRIEF DESCRIPTION OF THE DRAWINGS

In the drawings:

FIG. 5 illustrates a node's playback of scripts and storyboards that contains interactive choices.

FIG. 10 illustrates an exported spreadsheet providing a summary of the nodal network and the script segments contained within that network.

DETAILED DESCRIPTION

Figure 1:
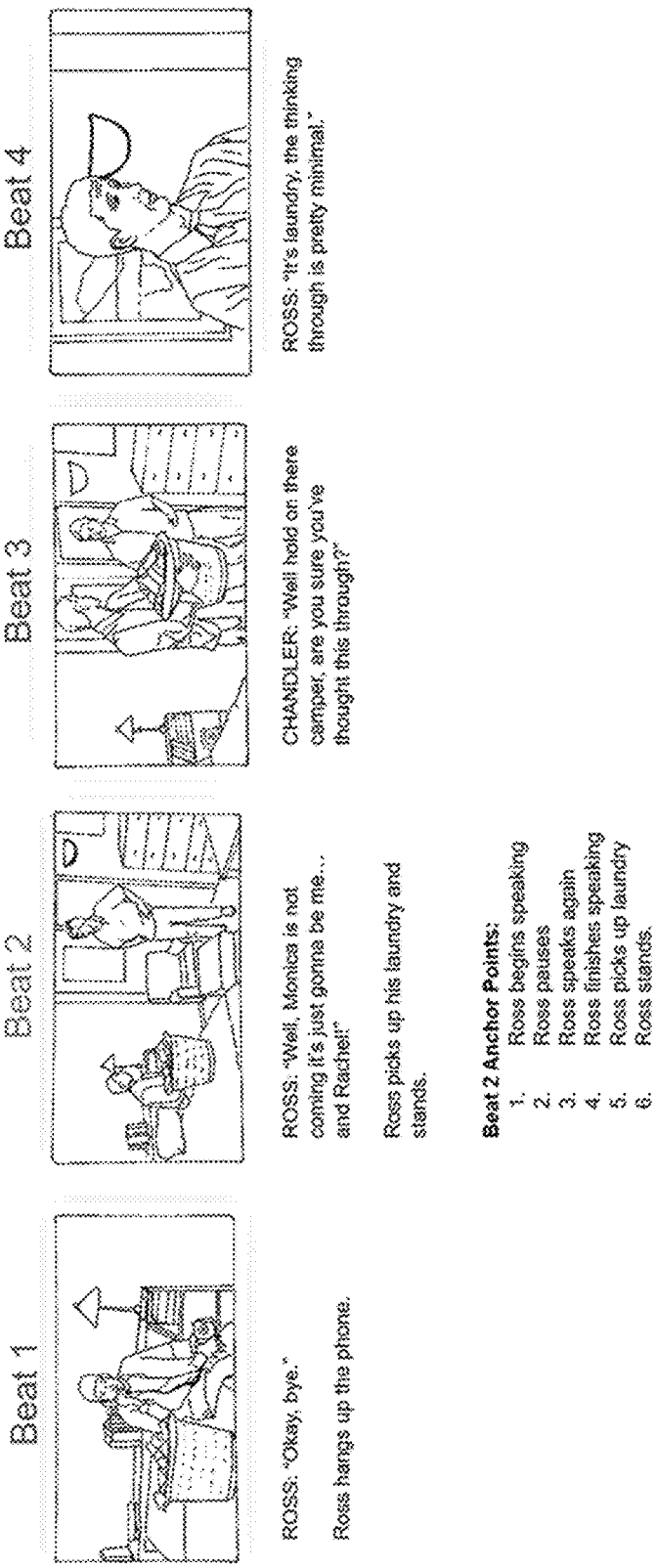
FIG. 1 illustrates how a short scene could be segmented into four story beats and each beat can be further segmented into one or more Anchor Points.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described according to the following outline, although the following description does not reproduce, as section headings, each and every item in the outline.

1. General Overview
    2. Overview of Structural Context
    3. Overview of Functional Context and Operation
        3.1—The Nodal Network
        3.2—Node Data Structure
        3.3—Node Settings
        3.4—The Anchor Point Editor
        3.5—The Script Editor
    4. Playback
    5. Beat Based Productions and Pipelines
    6. Beat Based Workflow
    7. Exporting Applications
    8. On Set Metadata Editing
    9. Machine Learning Assisted Anchor Point Generation
    10. Implementation Example—Hardware Overview

1. General Overview

The present disclosure provides computer-implemented techniques to divide a digital story into a series of story moments or beats, and to use beats as a basis of editing and playback. In an embodiment, interacting with the computer-implemented process of the present disclosure, an editor can edit and modify the parameters of each beat, adding and adjusting sound, video, music, interactivity, etc. When footage is captured, it may be segmented into corresponding beats, and each footage beat may then be used in the editor's arrangement of story beats. Each beat is played back according to the editor's arrangement, interactive logic, or other software. In this manner, a process of beat based editing is disclosed.

In one embodiment, the process creates an association between each beat and all occurrences of that particular beat within the footage, which may be identified by timecode using IN and OUT points. This approach allows for easily interchanging different versions of the beat without conducting a visual search to identify the specific IN and OUT points when the beat occurs in the footage. The process can also be applied to sound design, music, animation, and other types of performance capture.

Each beat also can be programmed to contain or be associated with interactive logic and directionality instructions that govern how the beat should be played and what beat should follow, making it useful for interactive films and films that can be dynamically modified on playback. Since a beat may be defined as any discrete moment in a story, and each beat is capable of association with interactive logic, beat based editing enables interactive films to offer a great number of viewer choices or product placements.

The process for identifying the IN and OUT points for each beat found within captured footage can also be assisted by machine learning. By expanding the type of data available to the computer beyond timecodes to story, logic, camera, sound, and other elements, beat based editing opens the door to implementation of artificial intelligence programming. Moreover, film editing templates can be incorporated to enable the computer to generate a rough first cut. Example film editing templates could specify a wide shot for opening sequences, or close ups for dialog.

Various embodiments provide an editor, a nodal network, a player, and a metadata format. In an embodiment, the editor implements a method of creating a nodal network representing a story's beats, editing the parameters of each node, and exporting the results as a stand-alone application, a spreadsheet, or an EDL for integration into traditional video-editing software. In an embodiment, the nodal network may be used to create references to audio and video files, determine editing patterns, create user interfaces (UI) for interactions causing branching operations and custom functionality, create and reference script segments, create display effects, and add audio controls. In an embodiment, the player implements a method of interpreting the nodal network and user interactions and profile in order to reproduce the playback and display of scripts, storyboards, video, user interfaces, and audio. In an embodiment, the metadata format comprises computer-readable data storage of media names paired with tags and values which, when interpreted, cause playback of a designated media at a calculated timing and execution of functionality at a particular OUT point. Metadata may comprise Anchor Points referencing a particular node within the nodal network, a moment in the video to be paired with another moment in a different video, an IN point, an OUT point, and a condition tag.

In one embodiment, at the pre-production stage, the story may be divided into story beats and labeled within the program. These labels describe the actions that will occur within each discrete piece of footage. During production, footage is marked with each beat as it is filmed. If there are several takes, each piece of footage is associated with the corresponding beat and can be easily accessed and substituted interchangeably. Since other elements in the edit can also be stored within the beat, the timing of each of these elements can also be rearranged dynamically to fit whatever footage was inserted, allowing for faster iterations. Beat based editing may also include interactive logic that is active during playback, allowing for a different playback each time the film is played, useful for interactive films. The beat based editing approach of this disclosure allows a computer to understand the substance of the footage being edited, a job previously only humans could do.

In one embodiment, the approaches of this disclosure can be used for live action film editing. In other embodiments, the system and method of the disclosure can be implemented using other technology solutions than those specifically described above. In addition, the system and method may be used for many different types of media or content such as audio, animation, including three-dimensional animation, video and audio, animatronics, three dimensional models, robots, music, and text. In addition to the interactive films referred to above, the system and method may be used for both individual scenes and multiple scenes, any live action and animation media, feature films, TV series, video games, and video advertisements, and any internet or streaming video applications. Beat based editing may be used at any stage of production of films, videos, or games, including script creation, editing, and review, previsualization (pre-viz), storyboarding, and VFX.

2. Overview of Structural Context

In one embodiment, a computer hosts or executes an operating system that supervises I/O, storage management, and execution of application logic. In an embodiment, the computer is coupled to storage, which broadly represents any data storage device, storage area network (SAN), network attached storage (NAS), or network file system (NFS) unit or server. Storage may reside on a network or on a server coupled to the network. Storage stores video files, audio files, documents, graphic files, metadata files, nodal networks, and other data.

In an embodiment, the computer further comprises a game engine which is capable of playing video and audio media, exporting applications, and which hosts a plug-in containing beat based editing logic for creating metadata files, nodal networks, interactive logic, scripts, and exporting EDLs and spreadsheets. Commercially available examples of game engines include Unity and Unreal Engine.

In other embodiments, the computer only comprises an application which contains logic for playback of a nodal network; such an embodiment might be used by an end user who is experiencing the media prepared by someone else. Thus, the use of nodal editing logic is unnecessary. The playback of the nodal network may be customized by user profile data and user interactions.

The nodal editing logic is generally configured to cause one or more processors in a computer to receive user input specifying story beats, videos associated with types of edits, moments within videos, user interfaces, graphic files, audio files, display effects, scripts, interactive logic, and other media; to create representations of the specified story beats in the form of a nodal network; to store the various nodal networks and metadata files; and to export the resulting nodal networks to applications, EDLs, or spreadsheets.

3. Overview of Functional Context and Operation

In an embodiment, beat based editing is facilitated by creating a network of nodes, each node containing data and executable instructions that are read and executed during playback. Each node may reference a metadata file that contains Anchor Points associated with one or more videos. An Anchor Point comprises a name and a timing within a video file, wherein the position is expressed as a time value or timestamp. The name of the Anchor Point can reference a moment in the scene, the Shot Code of a particular node, or a general IN or OUT point for the video file. In various embodiments, Anchor Points can be created and edited during a video shoot, during footage review, and during nodal editing. Upon playback, a node may use data provided by these Anchor Points to play a video file from a timing relating to that particular node's Shot Code, to cut between two different video files by matching both the name and timing offsets of two or more Anchor Points with matching names associated with those video files, or to play a video file from a generally designated IN point. During playback, a node will also use the data provided by Anchor Points to execute transitions to the next node in the nodal network or to execute logic provided within itself. The nodal network may be exported as an application or as a commonly used format such as EDL, AAF, or XML, for use within a commercially available video editing software, such as Adobe Premiere, AVID Media Composer, or Final Cut Pro.

FIG. 1 illustrates how a short scene could be segmented into four story beats and each beat can be further segmented into one or more Anchor Points. A beat, as used herein, refers to a moment within a story as defined by a user. The beginning and end points of each beat are based on the story and/or the user's choice. Referring to FIG. 1, in an embodiment, a first beat denoted Beat 1 is associated with recorded film or video in which a character Ross speaks "Okay, bye" and hangs up a phone. As the scene progresses, more beats may be denoted as chosen by the editor. In Beat 2, Ross says, "Well, Monica is not coming. It's just gonna be me . . . and Rachel!" and then picks up his laundry and stands. Each Beat can be further segmented by the editor or an AI assisted labeling process into a series of Anchor Points which described smaller actions contained within each beat. In Beat 2, Anchor Points could be defined as Ross Begins Speaking, Ross Pauses, Ross Speaks Again, Ross Finishes Speaking, Ross Picks Up Laundry, and Ross Stands. Like Beats, each Anchor Point can be associated with recorded film or video to allow node logic to cut between two different clips at any time without losing temporal coherence.

3.1 The Nodal Network

Figure 2A:
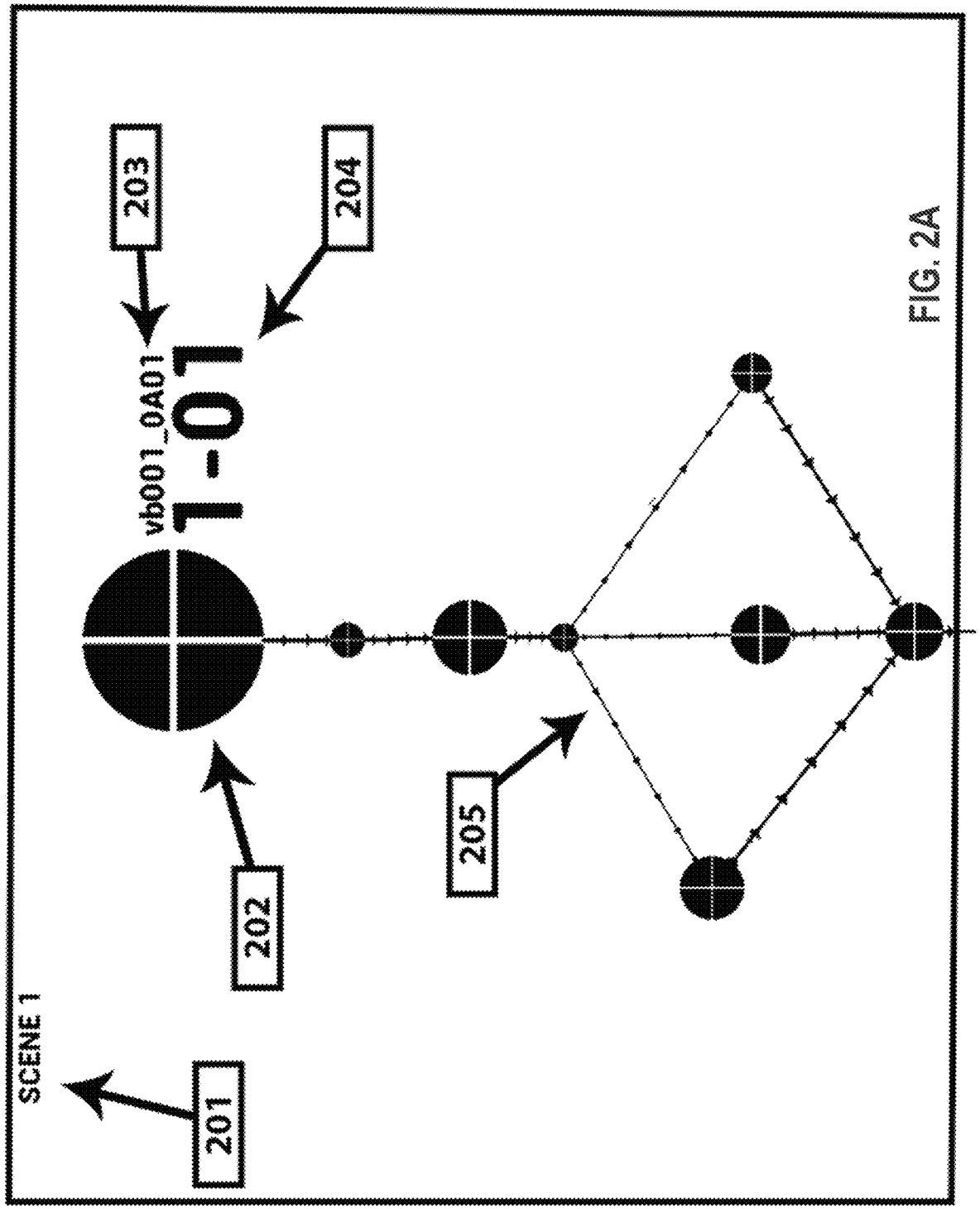
FIG. 2A illustrates a graphical representation of a nodal network with various branching nodes.

FIG. 2A illustrates a graphical representation of a nodal network with various branching nodes.

In one embodiment, nodes representing each story beat are assembled into a network using a graphical interface. Each node has a graphical representation 202 that is scaled according to the text length of the script segments contained within that node. The node is automatically assigned a Shot Code 203 which can be used to associate it with Anchor Points and their associated video files using metadata. The user can modify these Shot Codes if they wish. The user can also specify a Shot Name 204 which is used for organizational purposes. In the case that no Shot Name is specified by the user, the editor logic will generate a name matching the first script segment or video reference contained within the node associated with it. A line of arrows 205 will be shown when a user has determined that a node should begin playback following another node's playback or when an interaction made during one node's playback leads to the playback of another node. A comment box with text displayed above 201 can also be created by the user to allow for better visual organization of the nodal network.

Figure 2B:
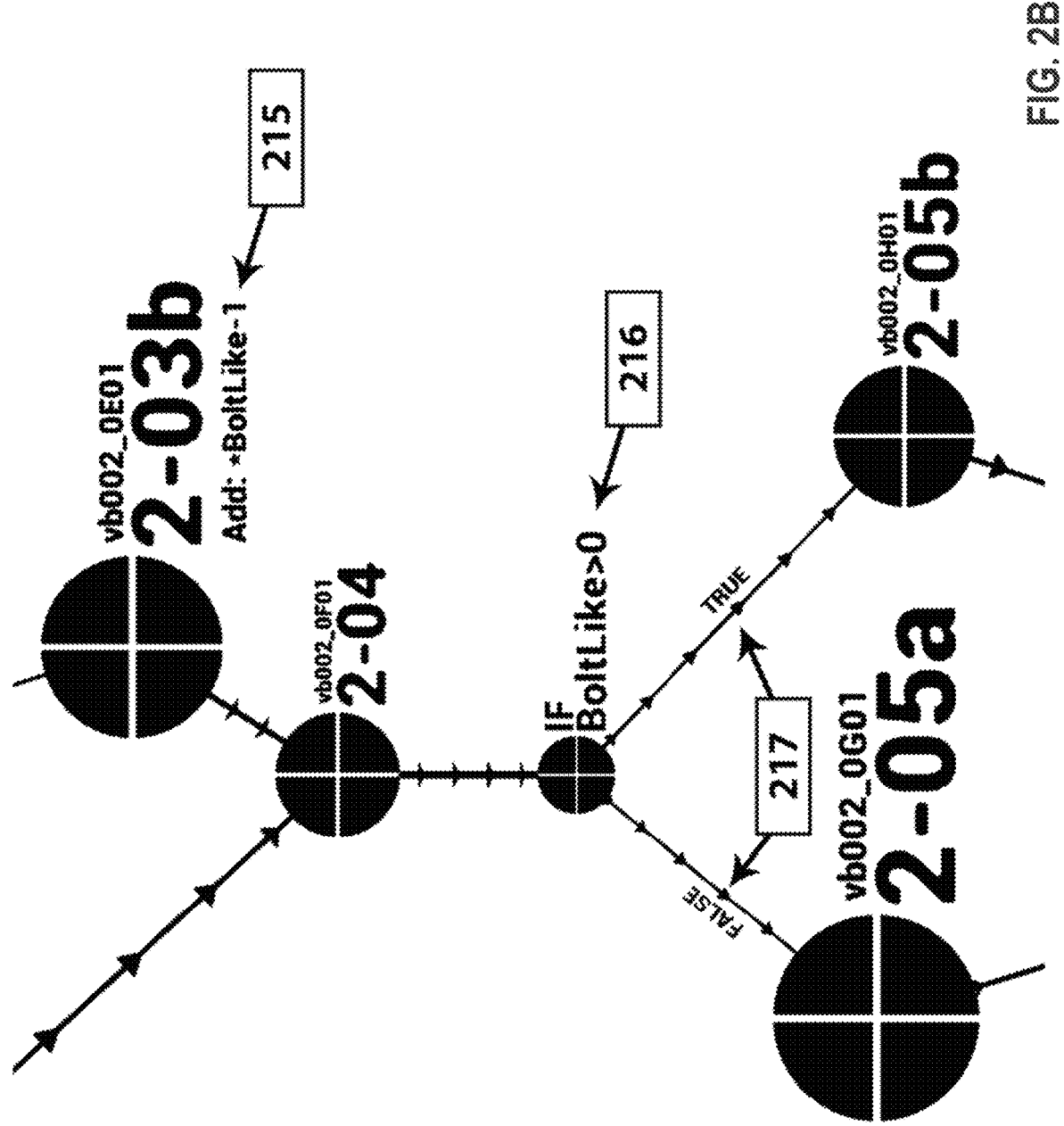
FIG. 2B illustrates a graphical representation of a node acting as a conditional redirector within a nodal network.

FIG. 2B illustrates a graphical representation of a node acting as a conditional redirector within a nodal network.

In one embodiment, nodes that the user has specified to add or remove conditions display such conditions 215. During playback, conditions are stored in temporary memory on the Player Pawn, a class that represents the current player, and may be used to determine different nodal paths 217. This Player Pawn's memory can be cleared at the end of each playback session. Alternatively, the conditions stored with the Player Pawn can be saved to a local file and loaded later to enable the saving and loading of a player's progress. The user can specify nodes to be used as Conditional Redirectors 216 that will query the conditions stored on the Player Pawn using basic mathematical expressions such as greater than, less than, and equal to, causing a branching path in the nodal network 217.

3.2 Node Data Structure

Figure 13:
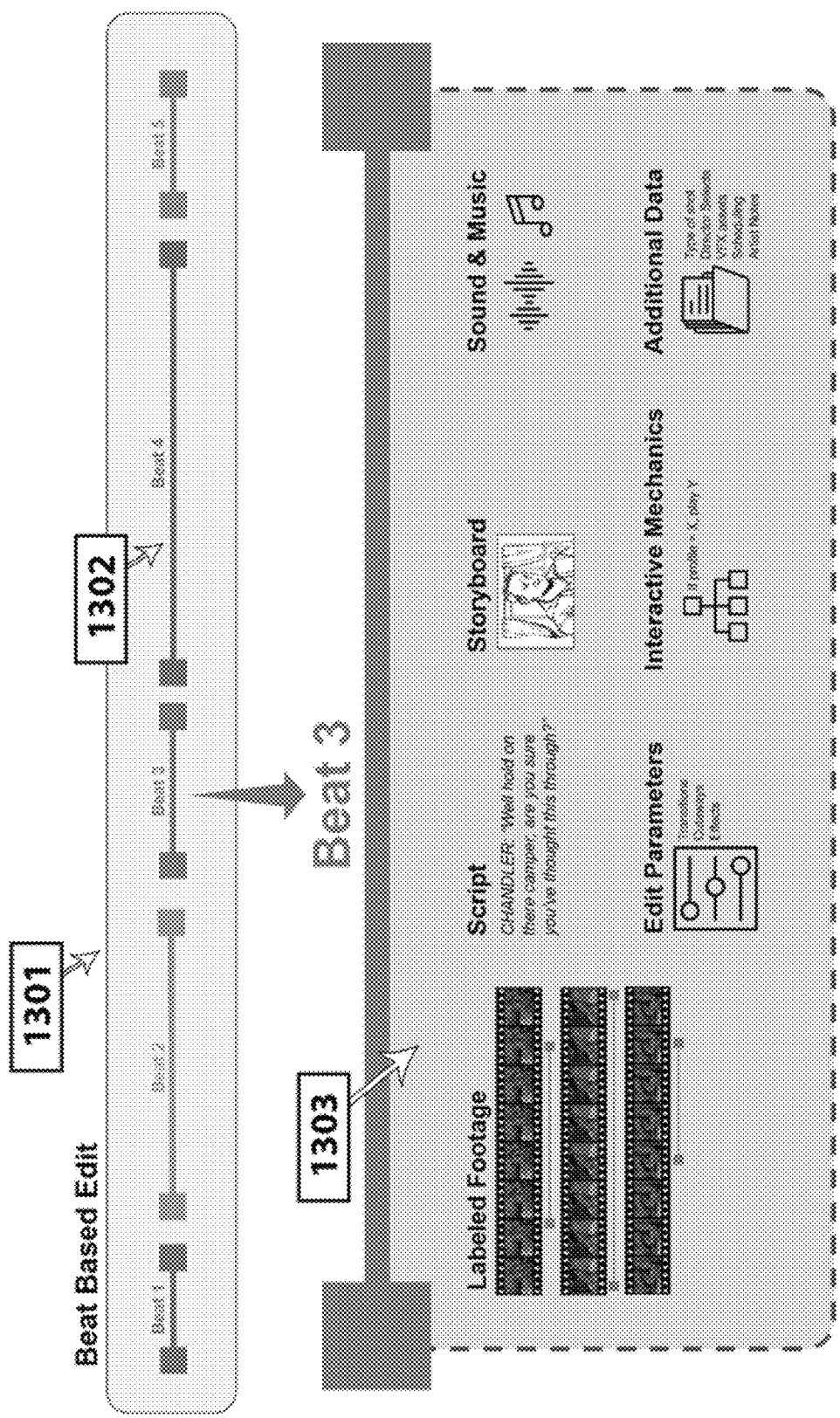
FIG. 13 illustrates the data structure of a beat/node used in beat based editing.

FIG. 13 illustrates the data structure of a beat or node used in beat based editing. In one embodiment, a node's data structure 1303 may be comprise of associated video files and their metadata, script segments, storyboard images, associated sound and music files, editing parameters, interactive mechanics, and additional data. The beat based edit 1301 would be represented by a network of nodes that represent each beat 1302.

3.3 Node Settings

Figure 3A:
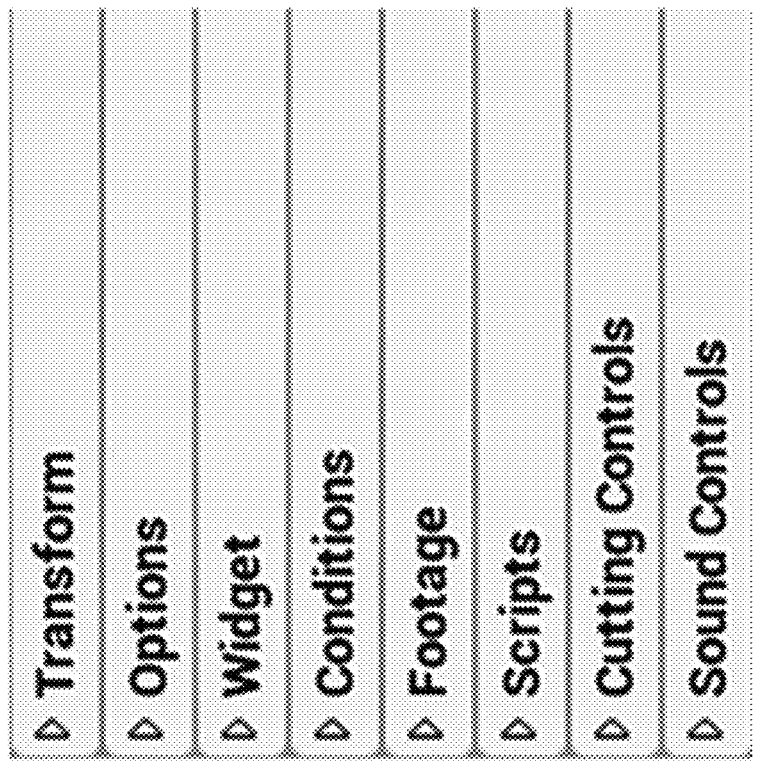
FIG. 3A illustrates the different categories of settings within a node.

In one embodiment, clicking on a node in the graphical interface will toggle it as selected and display that node's settings, allowing the user to configure its attributes. FIG. 3A illustrates the different categories of settings within a node. In FIG. 3A, the settings are grouped within eight drop-down menus: transform, options, widget (for player interactions), conditions, footage, scripts, cutting controls, and sound controls. Additional settings are possible.

Figure 3B:
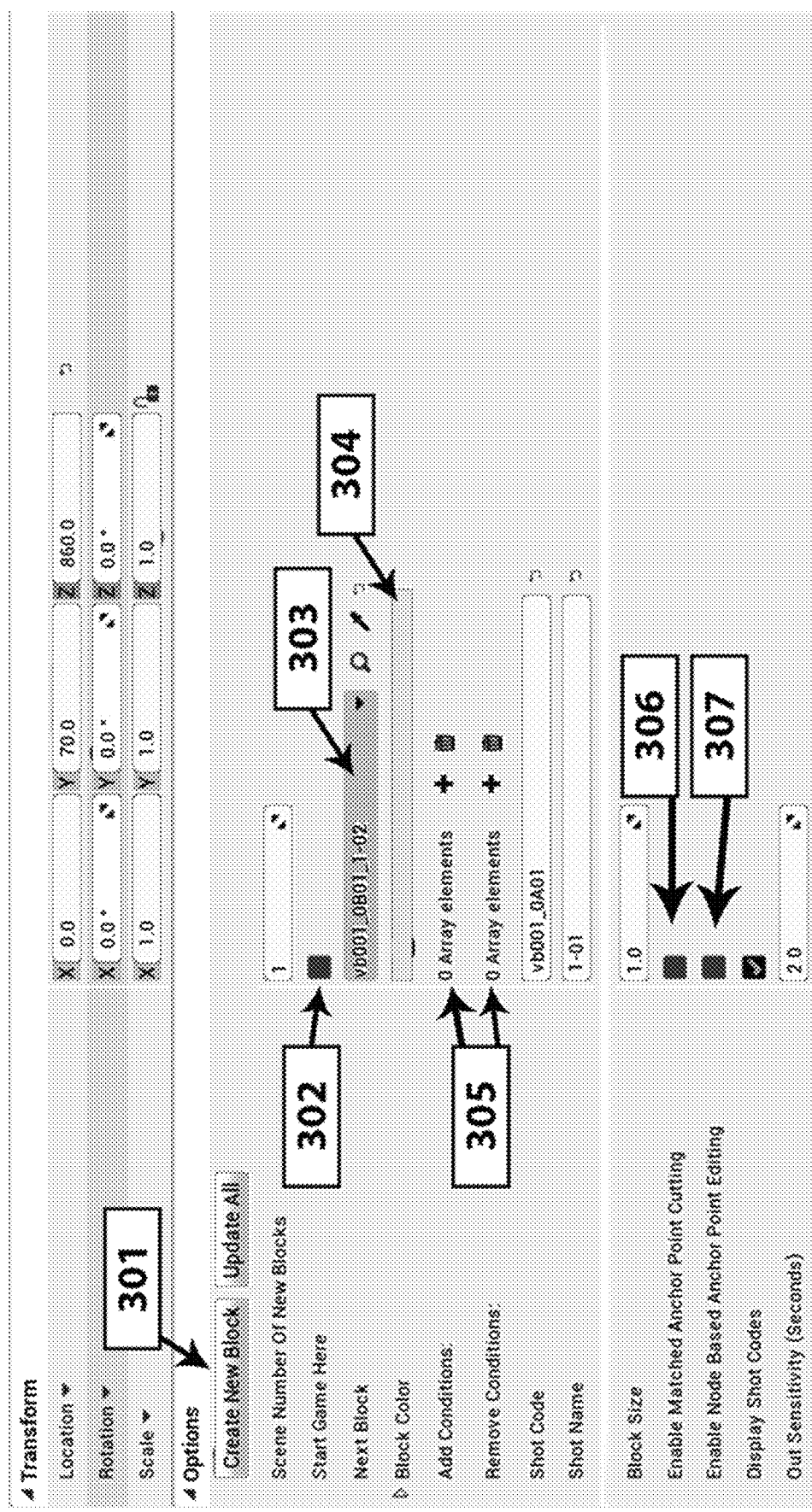
FIG. 3B illustrates the transform settings and general options of a node.

FIG. 3B illustrates the transform settings and general options of a node. The Transform section of a node's settings allows the user to specify the exact coordinates that the node should be placed within the nodal network.

Using the Options section, the user can create new nodes 301 that will automatically be assigned unique Shot Codes dependent on the current scene number and placed near the currently selected node. The user can specify whether the node should play immediately when the game is started 302. When a particular node is set to play at the start of the game, any previous node set to play at the start of the game will be disabled. The user can specify which node is to playback after the selected node's playback is finished 303. The user may choose the display color of the currently selected node 304 as well as its display size and whether it should display its Shot Code on the nodal network. The user can add an array of conditions to be added or removed when the selected node begins playback 305. The user can also enable Matched Anchor Point Cutting 306, a process that finds the closest Anchor Point in the currently playing video file and attempts to find an Anchor Point within the video file associated with the selected node with a matching name, and then plays the associated video at a position that matches the offset between the currently playing video's current position and the matched Anchor Point. If no matching Anchor Point is found, the video associated with the currently selected node will be played from the beginning or its default IN point. Anchor Points can be created and edited through the Anchor Point and Condition Editor, as described further herein with reference to FIG. 8. Matched Anchor Point Cutting 306 is useful when nodes cut between two different videos at any point in time due to player interactions and need to keep the temporal content of the scene consistent. The user can also enable Node Based Anchor Point Editing 307, a process which will play the video files associated with the currently selected node from the Anchor Points that have names matching the selected node's Shot Code. Node Based Anchor Point Editing 307 is useful when a single video file is being used across multiple nodes. It allows each node to refer to its own unique segment of the video file.

Figure 3C:
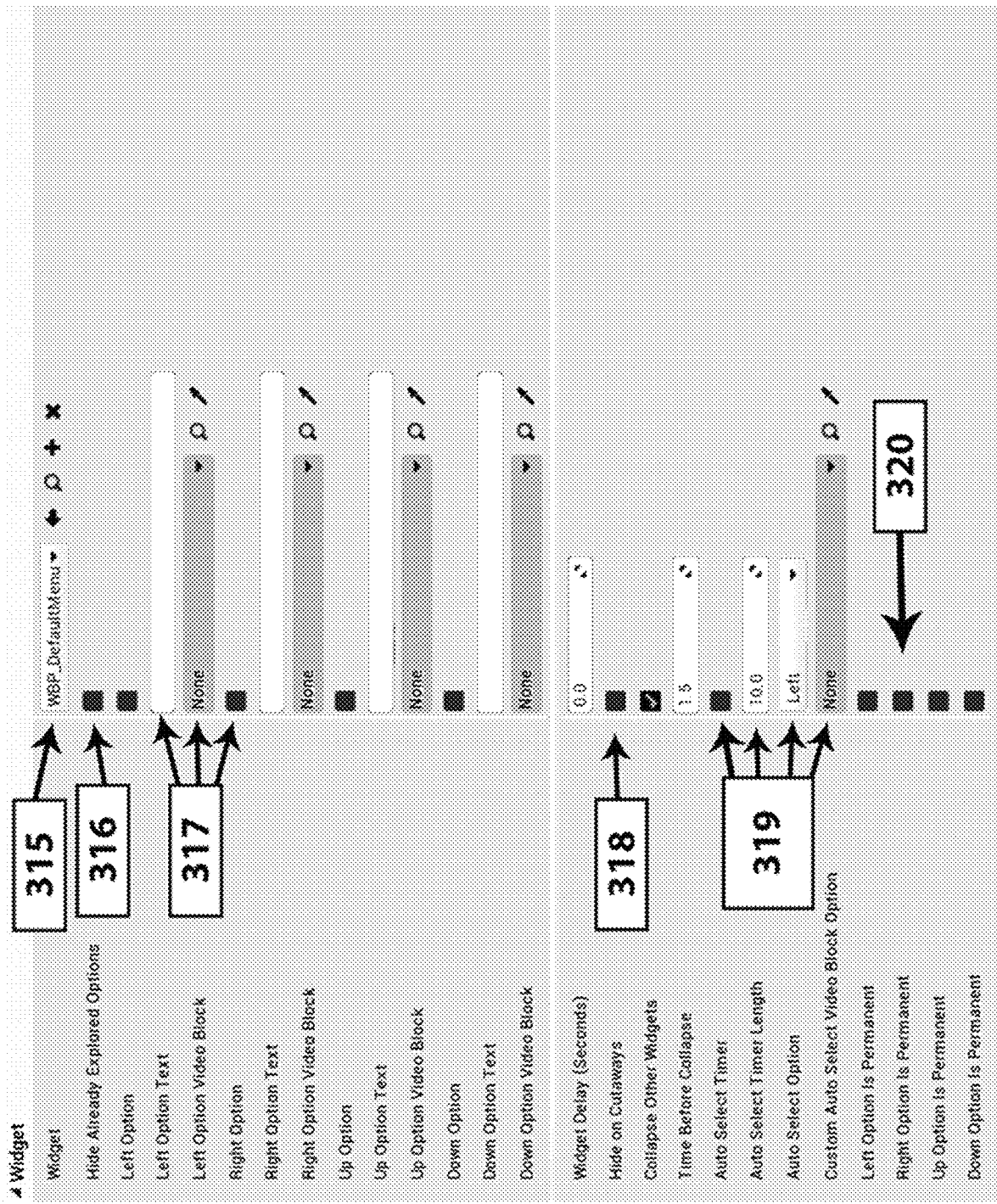
FIG. 3C illustrates the user interface (widget) and interactive branching options within a node.

FIG. 3C illustrates the user interface (widget) and interactive branching options within a node. In one embodiment, using the Widget section of a node's settings allows the user to specify the type of user interface 315 to use and to set up default interactive branch actions 317. The user can specify 316 whether previously chosen paths should be hidden when a node is being played for a second time within the same playback session. Then the user can specify any choices that should remain permanently 320 despite the previously mentioned setting 316. When specifying different interactive choices 317, the user can enter text to be displayed within the widget 501 and the node that option will activate. If the currently selected node contains associated video files that are categorized as Cutaways 333, the user can specify whether the widget should be hidden when those video files are being played 318. This is useful when the interactive choices are related to particular camera direction which is not shared between a Main Shot and a Cutaway. Any delays before widgets are displayed or hidden can also be specified by the user. The user may specify a duration to allow the player to make a choice before a choice is automatically selected 319. The timer will be displayed during the node's playback 502. If the user has a custom widget that has been build, that widget can be specified 315, and it will be displayed during playback 601.

Figure 3D:
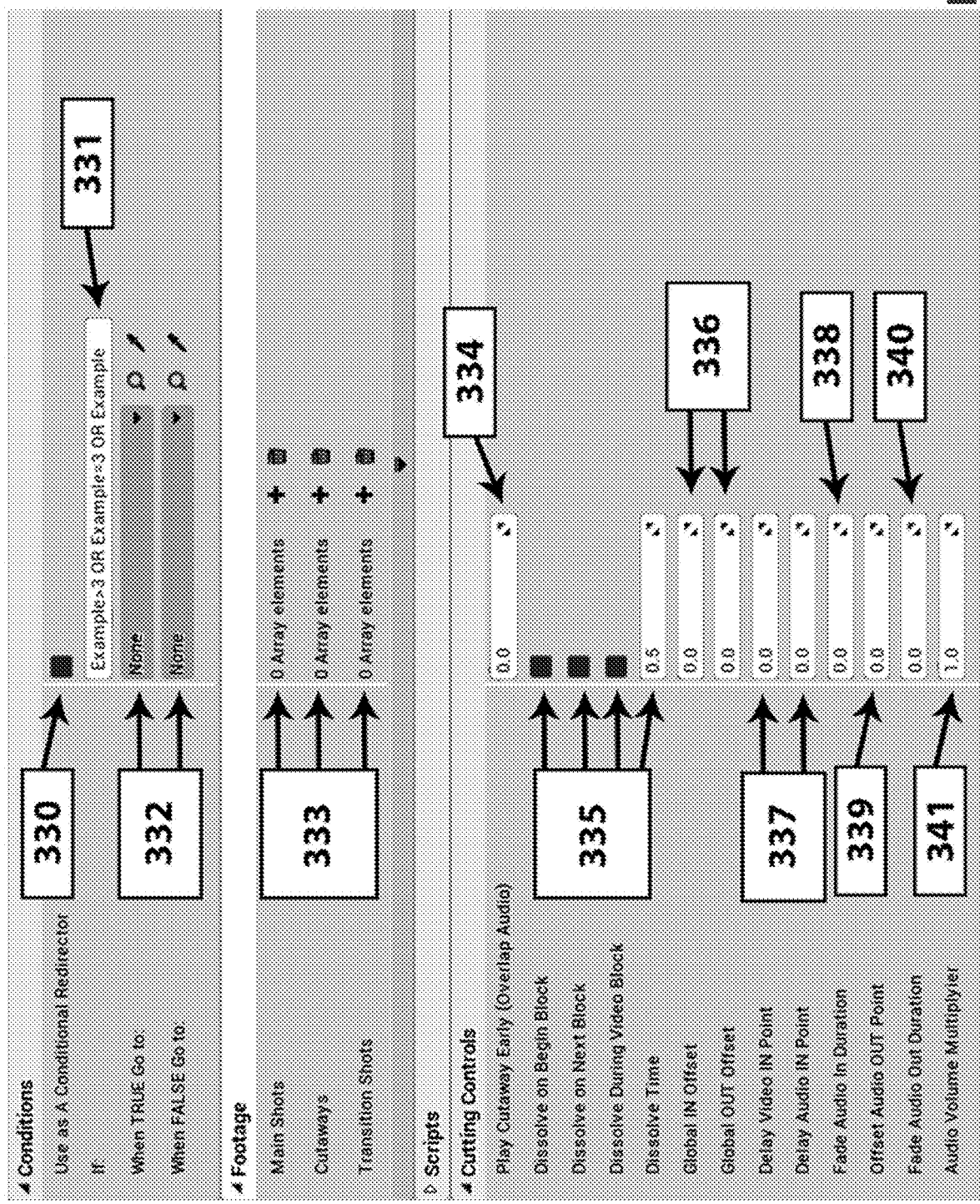
FIG. 3D illustrates the conditional redirection settings, video references and categories, and cutting controls within a node.

FIG. 3D illustrates the conditional redirection settings, video references and categories, and cutting controls within a node. In the Conditions section of a node's settings, the user may specify if a node should act as a Conditional Redirector 330. A Conditional Redirector will use a mathematical expression 331 to query the currently saved conditions stored on the Player Pawn. The user then can specify which nodes to activate 332 if the expression is true or false.

In the Footage section of a node's settings, the user may specify a category 333 for each associated video file. In an embodiment, these categories may be Main Shots, Cutaways, and Transition Shots. Upon a node's activation, a random Transition Shot will be played, after which a random Main Shot will be played. After the Main Shot is played, a random Cutaway will be played. Once the Cutaway has finished playback, if no other node has been set to be activated 303, another random Main Shot will be played. If there are no associated video files within a category 333, that category's playback will be skipped.

In the Cutting Controls section of a node's settings, the user can make finer modifications as to how its associated video files should be played back. The node can be set to dissolve 335 on the first video it plays, between the videos it plays, at the end of the final video it plays, or any combination of the above. The user can specify an offset to any IN point or OUT points found within the associated videos 336. The video and audio can each have a unique delay set 337. The user can specify a duration to play Cutaway Shots 333 earlier in order to overlap them with the preceding Main Shot 334. Fade in 338 and out 340 duration for audio can be specified. Audio can also be set to continue playing underneath the next video's playback 339. The user can also specify a general volume multiplier 341 to be applied to all associated video playback.

Figure 3E:
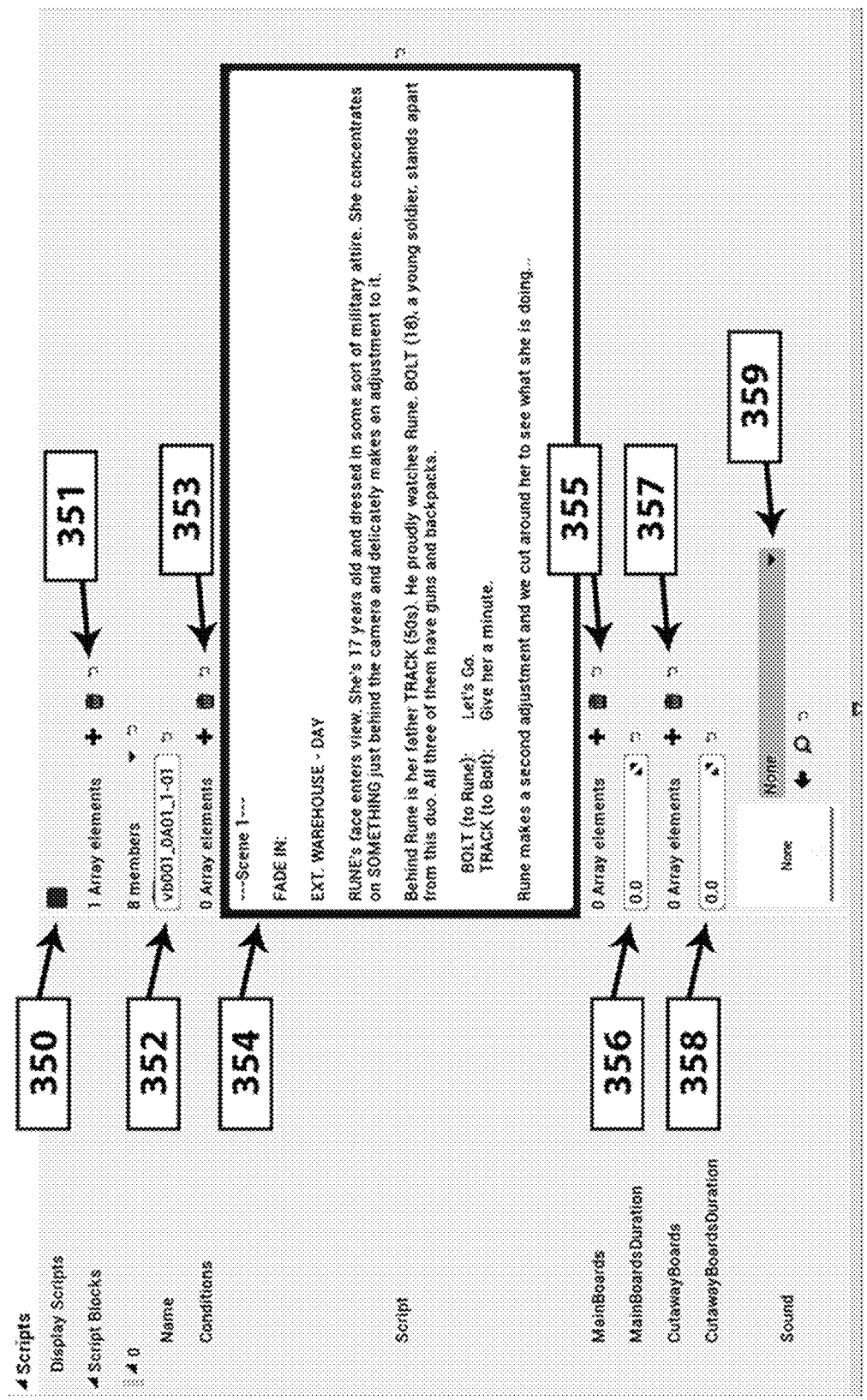
FIG. 3E illustrates the data structure of scripts and storyboards within a node.

FIG. 3E illustrates the data structure of scripts and storyboards and their settings within a node. In the Scripts section of a node's settings, scripts segments, storyboards, and sound can be added and edited. The user may specify 350 whether the selected node should show the script and storyboard in place of playing video files during playback. The user can create multiple scripts to be associated with the selected node 351. Each script contains a data structure that allows for it to be associated with a user-specified name 352, text 354, conditions 353, images 355 and 357, and sound 359. A scripts text may be edited inside an editable text box 354. Conditions 353 will be used in the same way a condition associated with a video file is. They will be stored within the Player Pawn upon playback and used to find the closest matching associated scripts or videos. Images can be divided into two categories. Images within the MainBoards array 355 will be displayed for a specified duration 356 after which an image in the CutawayBoards will be displayed for a specified duration 358, after which the process will repeat. If there is more than one image in either category, one will be chosen at random. The user specified sound will be played upon the selected node's activation 359.

Figure 3F:
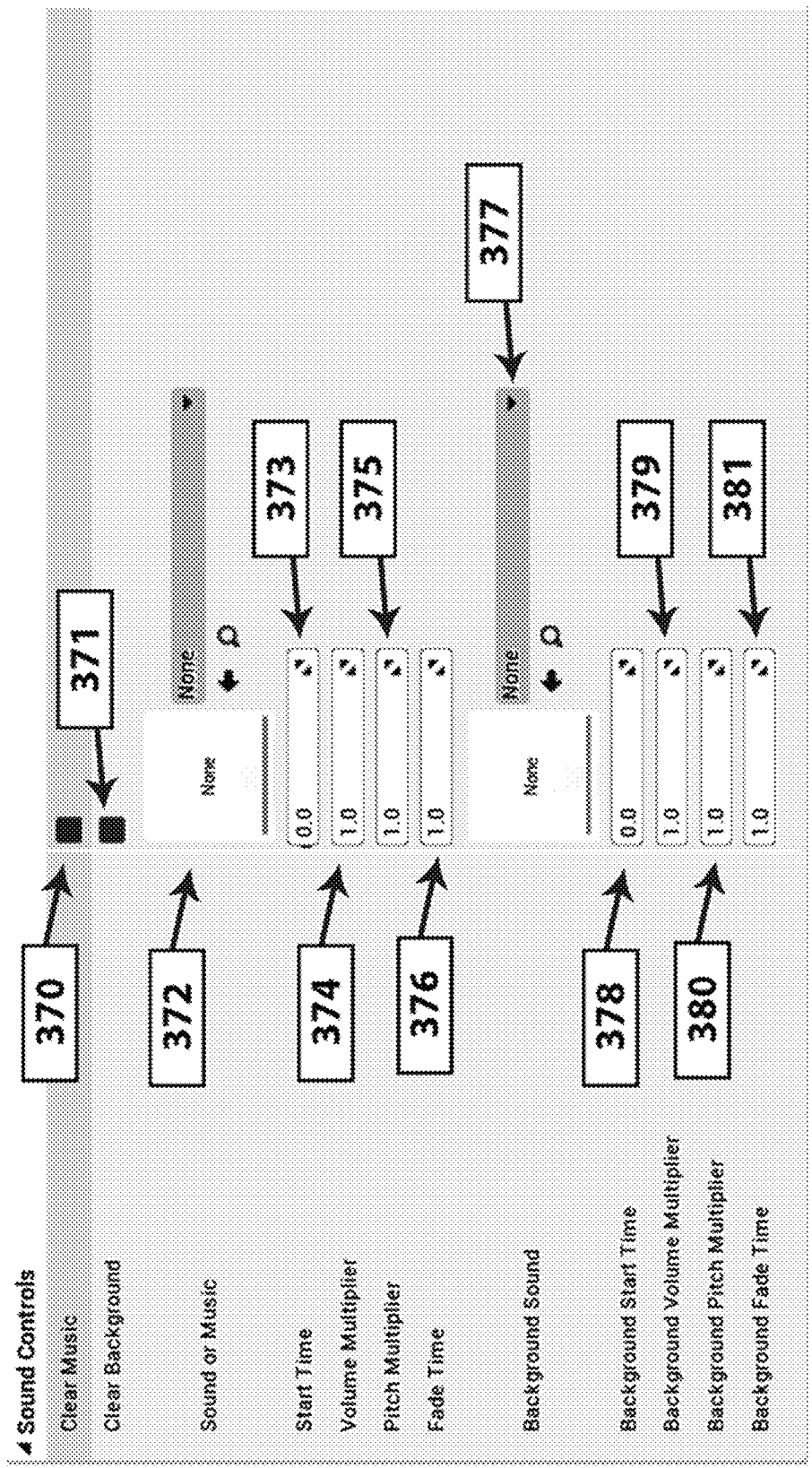
FIG. 3F illustrates the sound and music controls within a node.

FIG. 3F illustrates the sound and music controls within a node. In the Sound Controls section of a node's settings, the user can add and modify the playback of music 372, background audio 377, and sound clips 372. In an embodiment, a user can specify if all previously playing music or background audio should be stopped upon the selected node's activation 370 and 371. The user can specify an audio file 372 to be played back upon the selected node's activation. If the audio file specified in 372 has a naming prefix of "music_", it will be categorized as Music. Only one audio file categorized as Music can be played at a time during a playback session. When the node attempts to play an audio file with the prefix of "music_", it will first check if the same file is already playing; if true, the volume specified by the user 374 will be applied to the previously playing music using the fade time specified 376; if false, the previous music will be faded out using the fade time specified 376, and the selected node's music 372 will be faded in 376 at the volume specified 374. This process is meant to prevent multiple conflicting musical pieces from playing on top of each other. The same process is applied to audio specified as background sound 377 using the volume multiplier 379 and fade time 381 specified. The user may specify a time within the audio files to begin playback 373 and 378. A pitch multiplier for both the sound, music, or background audio can also be specified 375 and 380.

In an embodiment, a node's settings may include a section for adding various display effects. Effects such as zoom in, zoom out, camera shake, color correction, can be specified by the user. The duration of such effects can be specified as a duration of time or a duration of the node's activation where the effect begins at one node and ends at another. These effects would be applied in real-time during a node's playback, allowing interactive elements to dynamically affect the videos being played without having to pre-render the display effects.

In an embodiment, a node's settings may include a section for designating a desired shot type to be played by the node. Shot types may consist of Close Ups, Wide Shots, Medium Shots, and other types specified by the user. The video files may then be associated with a particular shot type through metadata, allowing the node to reference a video's metadata and play the desired shot type upon playback.

3.4 The Anchor Point Editor

Figure 8:
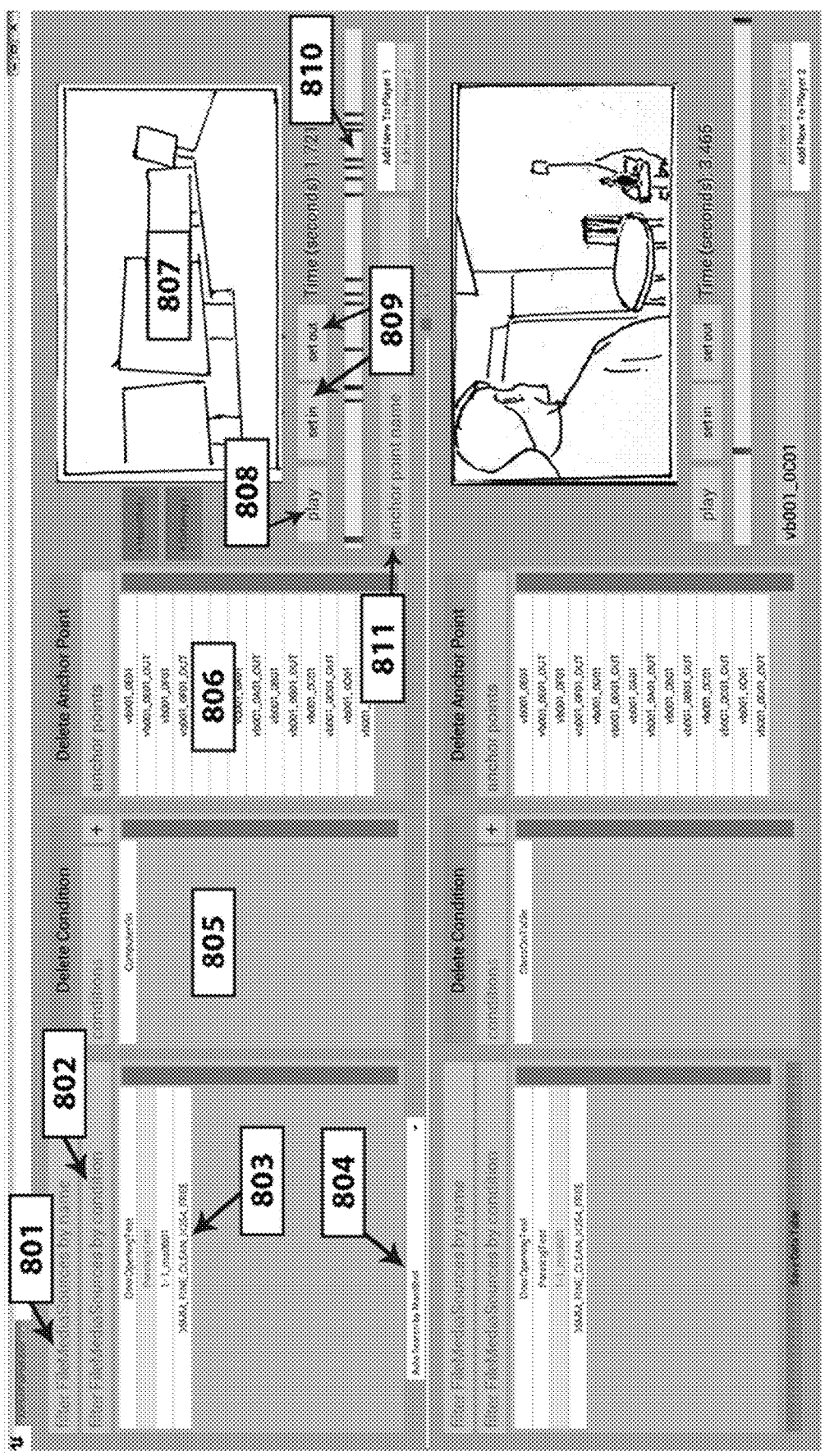
FIG. 8 illustrates an Anchor Point and condition editor for video files.

FIG. 8 illustrates an Anchor Point and condition editor for video files. In one embodiment, a user may use an Anchor Point Editor to edit the metadata associated with one or more video files. The user may filter all video files contained within the project by name 801 or by condition 802. The resulting filtered videos will be represented by buttons listed in a scrollable box 803. The user can use a drop-down menu 804 to allow for the editor to automatically populate the name filter text box 801 with the currently selected node within the nodal network. The drop-down menu 804 can also be set to find all videos that contain Anchor Points matching the currently selected node's Shot Code, or to find all videos that have names that contain the name of the currently selected node. The user can select a video by clicking on the button within the filter videos box 803. Selecting a video will populate the conditions scroll box 805 and the Anchor Points scroll box 806, begin playing a preview of the video inside a video preview window 807, and place markers along a timeline 810 to represent the timings of each Anchor Point associated with that video. The user may delete a condition or Anchor Point from a video's associated metadata by selecting the desired button from within a scroll box and clicking the "Delete Condition" or "Delete Anchor Point." The user may add a condition to a video's metadata by typing in the text of the condition in the text box above the conditions scroll box 805 and clicking the button with a "+" adjacent to the conditions text box. To add an Anchor Point, the user navigates to a particular time within the selected video using either the play/pause button 808 or by click-dragging the play-head inside the timeline 810, enters the name of the Anchor Point inside the Anchor Point text box 811, and clicks the "Add New To Player 1" button. A pair of "set in" and "set out" 809 buttons can be used to set general IN points and OUT points for a video. In an embodiment, one or more videos can be loaded into the Anchor Point editor simultaneously to aid the process of cross-referencing Anchor Points and conditions between two or more videos.

3.5 The Script Editor

Figure 9:
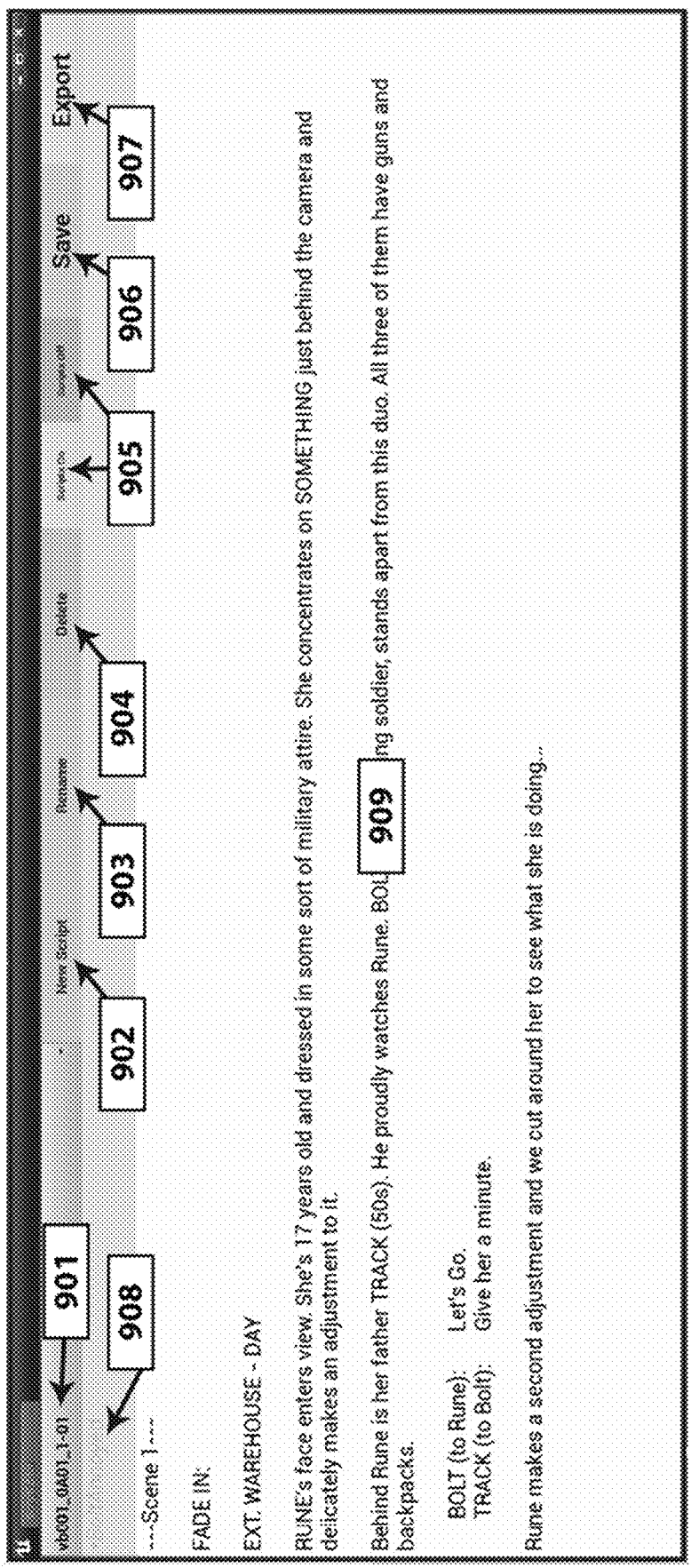
FIG. 9 illustrates a script editor for editing the script segments associated with a node.
Figure 10:
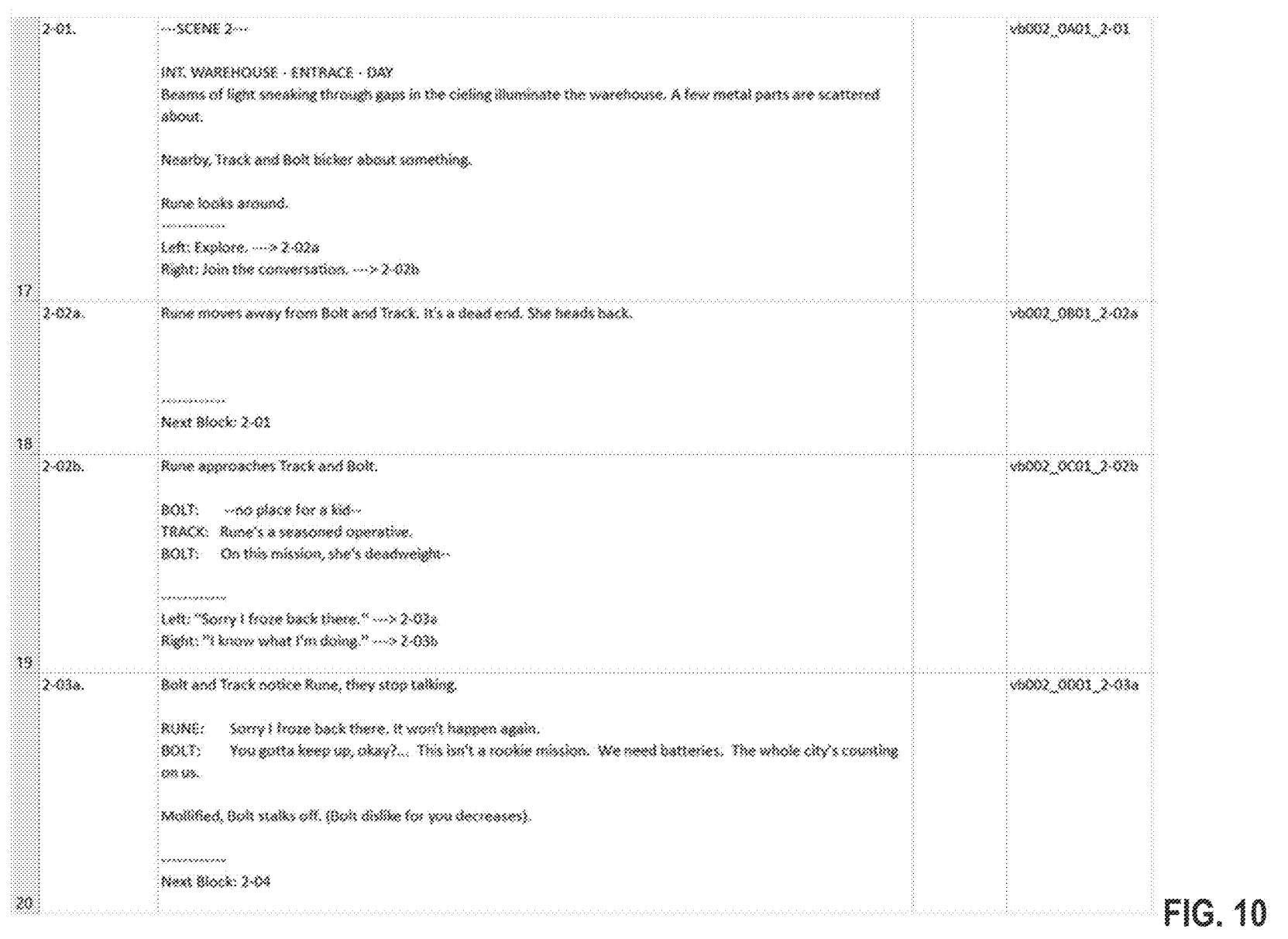

FIG. 9 illustrates a script editor for editing the script segments associated with a node. In one embodiment, a user may use a Script Editor to edit the script names, text, conditions, save the current arrangement of nodes and their settings within the network, and export a spreadsheet of the scripts contained within the current nodal network. FIG. 10 illustrates an exported spreadsheet providing a summary of the nodal network and the script segments contained within that network.

The Script Editor may work in tandem with the graphical representation of the nodal network, automatically displaying any scripts associated with the currently selected node in a drop-down list 901. The currently selected script within the drop-down list 901 will have its conditions displayed in an editable text box 908 and its script text displayed in another editable text box 909, allowing for easy drafting or editing of the script's conditions and text. The user can add a new script to the drop-down list 901 by clicking on a "New Script" button 902. The newly generated script will be associated with the currently selected node. Clicking on the "Rename" button 903 will allow the user to specify a new name for the current script. Clicking on the "Delete" button 904 will delete the script. The user can specify whether all nodes in the network should be set to display scripts on playback 350 with the buttons titled "Scripts On" and "Scripts Off" 905. Clicking on the "Save" button 906 will save the current nodal network and its changes to a local file. Clicking on the "Export" button 907 will allow the user to specify a name and save a CSV file that contains all script segments contained within the current nodal network as seen in FIG. 10.

4. Playback

Figure 4:
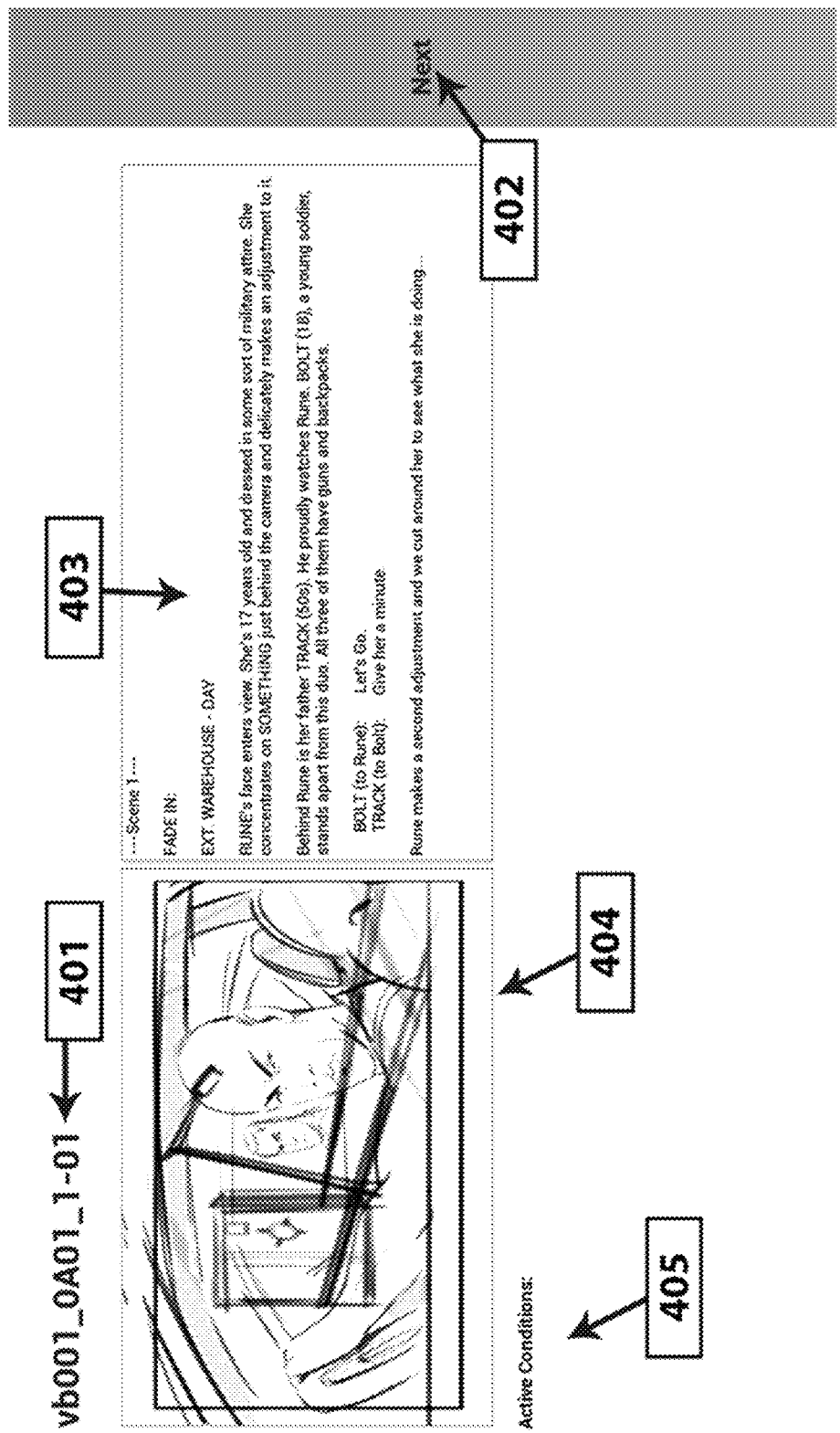
FIG. 4 illustrates a node's playback of scripts and storyboards.

FIG. 4 illustrates a node's playback of scripts and storyboards. In one embodiment, during playback when a node is activated and set to display scripts and storyboards 350, its Shot Code and Shot Name 401 would be displayed in the top left of the playback window. The script text associated with the current node would be displayed within a window 403, and any storyboards would be displayed as well 404. Active conditions of the current playback session would be displayed 405, allowing the viewer to see a visual representation of the interactive choices made during that particular playback session. When a node has been set to automatically advance to the next node 303 without displaying an interactive choice, a "Next" button will be displayed 402. Clicking the "Next" button 402 will result in activating playback on the next node within the nodal network.

FIG. 5 illustrates a node's playback of scripts and storyboards that contains interactive choices. In one embodiment, when a node's settings do not include a preconfigured next node 303, but instead contain a series of interactive choices 317, those choices will be displayed on the screen during playback 501. If there is a timer set for those choices 319, a progress bar will be displayed to show the remaining time 502. Once the timer has finished, playback of the auto select node 319 will be activated.

Figure 6:
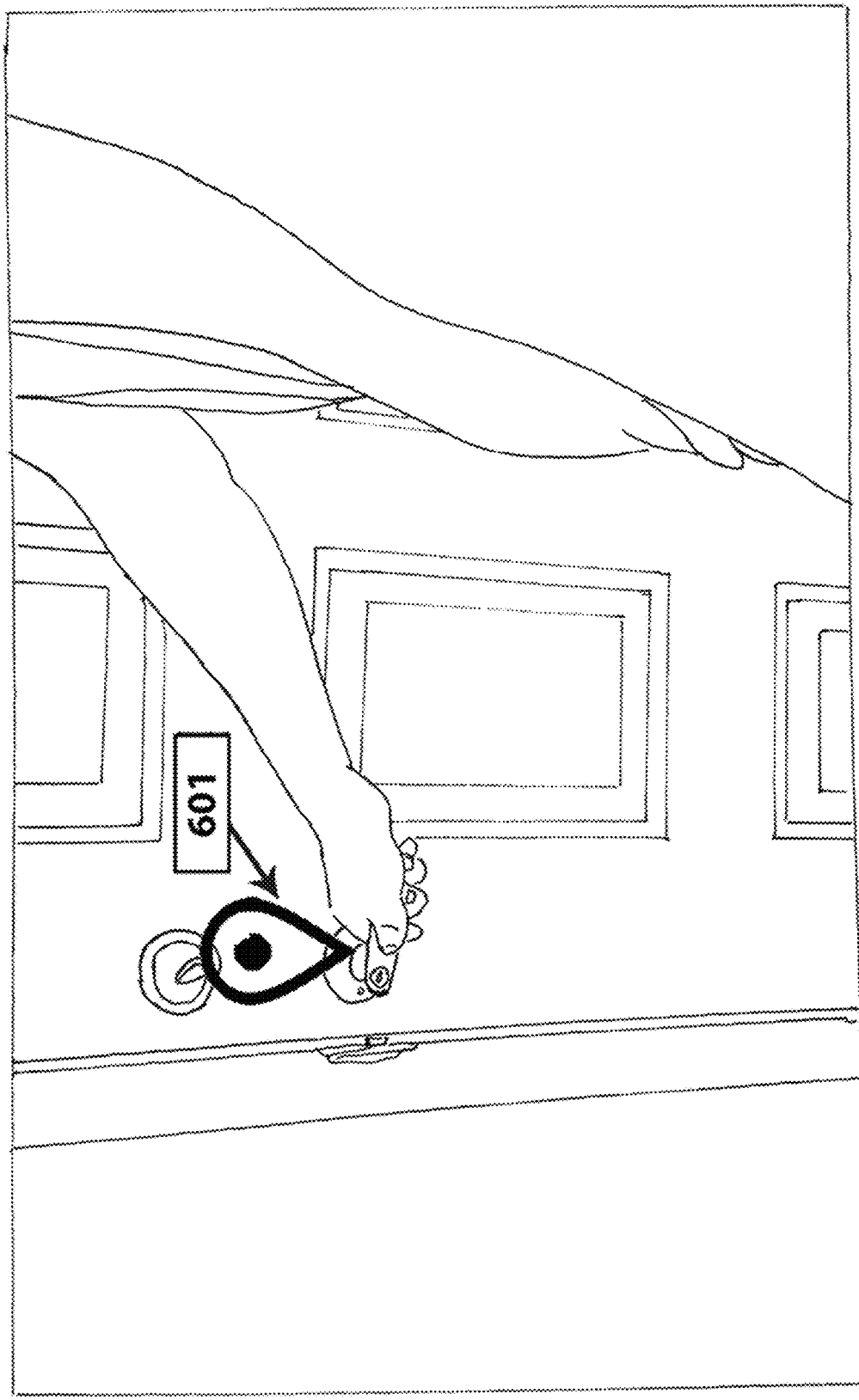
FIG. 6 illustrates a node's playback of video that contains a customized interface (widget).

FIG. 6 illustrates a node's playback of video that contains a customized interface (widget). In one embodiment, when a node contains video 333 and is not set to display scripts and storyboards 350, the video will be displayed. 601 shows the use of a customized interface using user-created textures within a node set to display video. These customized interfaces may be scripted to activate another node's playback when clicked.

Figure 7:
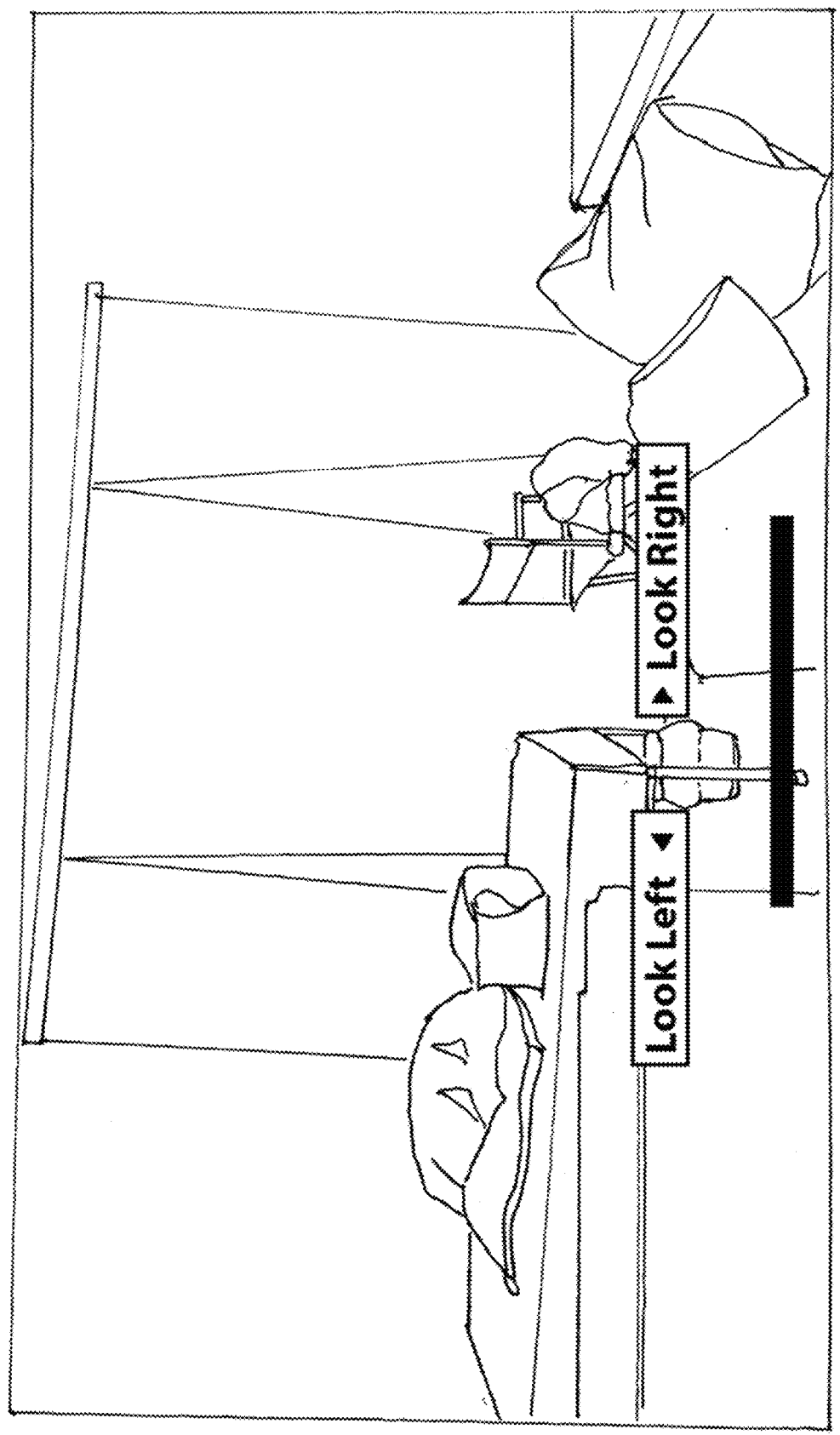
FIG. 7 illustrates a node's playback of video that contains default interactive choices and a timer.

FIG. 7 illustrates a node's playback of video that contains default interactive choices and a timer. In one embodiment, such as when a node is set to display scripts and storyboards, a node playing video and interactive choices with a timer will use a graphical interface to display those choices. The viewer can use the arrow keys on a keyboard or click on the different options to activate them and their associated nodes 317.

In one embodiment, at any time, the user may initiate playback of the nodal network. Upon playback, the node set to play at the start of the game 302 would be activated first. Each node would display either script segments, storyboard images, or videos according to their user configured settings as referenced in FIG. 3E. A Player Pawn is created to temporarily hold data relevant to the current playback session. In an embodiment, the data may include video preload duration, current clip metadata, current media player data, and conditions. Nodes may query the Player Pawn when solving interactive logic. In an embodiment, to provide seamless video playback, a node may spawn an instanced media player for each video it plays, allowing the video to be buffered before the previous video has ending. After a video has begun playback, the node will store the associated OUT point timing for that video derived from its beat based metadata and actively check if the video's current playback position equals or is greater than that timing. If true, the node will play the next video associated with it or activate the next node. Then the node will end playback of the just-played video.

5. Beat Based Productions and Pipelines

Figure 11:
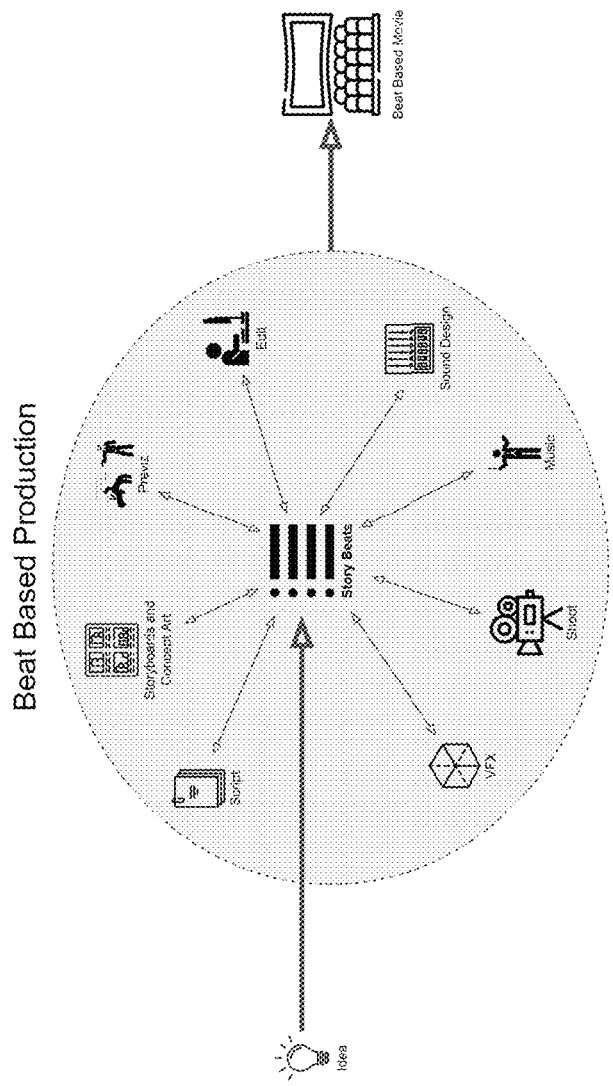
FIG. 11 illustrates the pipeline of a beat based production.

FIG. 11 illustrates the pipeline of a beat based production. In one embodiment, beat based editing may be utilized throughout a film's production by integrating it throughout the pipeline. Traditionally, many elements, such as storyboards, previz, and scripts, of the film's pipeline are separate from each other and only utilized through a visual reference, such as a video file or PDF, which does not contain the underlying data used to create the deliverable. In a beat based production, these elements are associated at all times with nodes within the nodal network, allowing the same nodes to be used to generate the final edit of footage, music, and sound design. Due to this integration, they can be swapped in and out at any time. At any point, the beat based edit could be exported in a format friendly to traditional editing software such as Adobe Premiere, AVID, or Final Cut. In addition, when a change is made to a node within the nodal network, that change can be applied to all elements of the production pipeline automatically as well as any media associated with that node.

6. Beat Based Workflow

Figure 12:
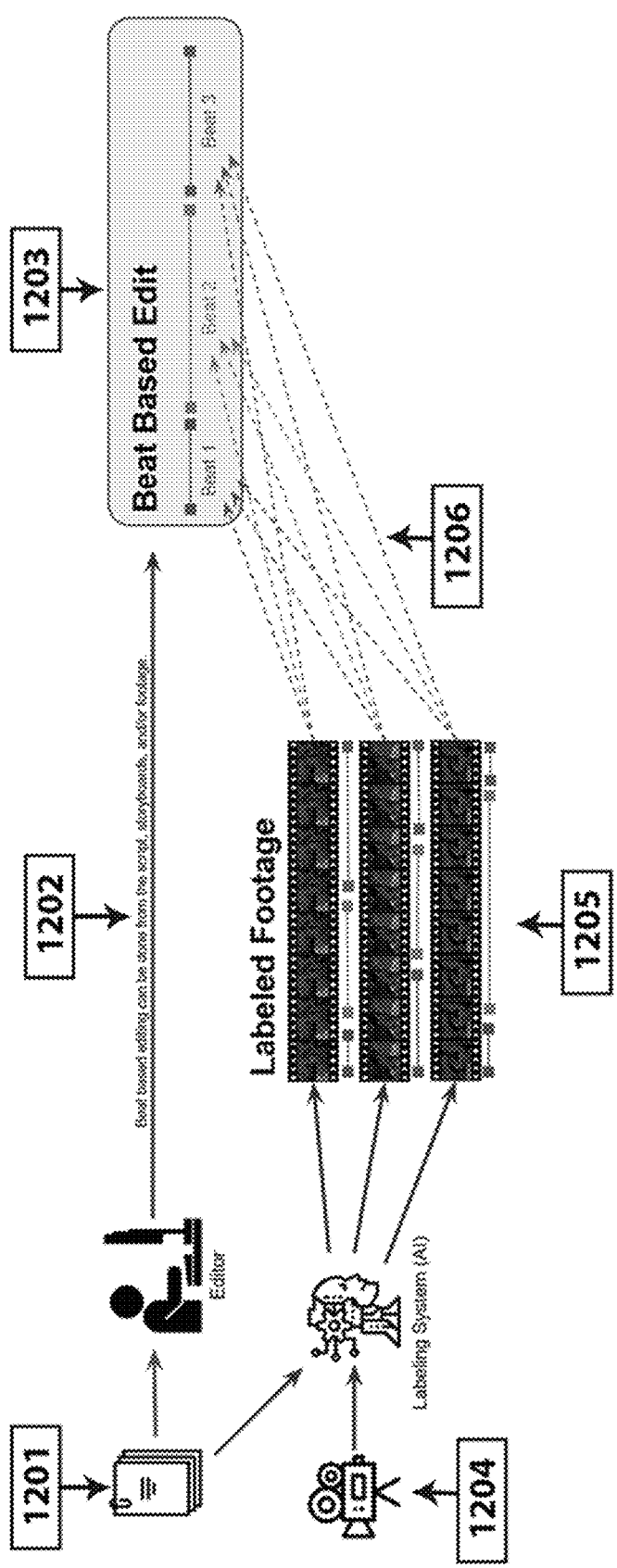
FIG. 12 illustrates the workflow of beat based editing.

FIG. 12 illustrates the workflow of beat based editing. In one embodiment, a beat based workflow may allow for a rough cut of a story's beats before video is captured; upon capturing video, automatic and instant ingestion of the video into the story's rough cut allows for rough cut reviews shortly after or even during film shoots. In an embodiment, the script 1201 would be given to an editor preceding the film shoot. The editor would then use script segments, storyboards, and/or previz 1202 to assemble a beat based edit comprising of a nodal network which represents the rough cut 1203. The editor would also be free to add music and sound design elements. When video is captured 1204, it is processed by an Anchor Point labeling system that associates segments of the video with the nodes within the beat based edit 1203 using each node's unique Shot Codes. The result is a collection of video files associated to various nodes through metadata 1205. In an embodiment, the metadata could also include the director's select takes. The node editing logic would then automatically ingest footage into each node using the metadata 1206.

7. Exporting Applications

In an embodiment, at any time, the user can export a nodal network as an application for Mac, Windows, IOS, or Android operating systems. The resulting application can be played without the need for installation of the node editing logic.

8. On Set Metadata Editing

In an embodiment, the user may generate metadata for video files simultaneous to the video file's capture on set. The video to be capture would be assigned a unique file name associating it with the to be generated metadata. During the capture of the video, the user would receive the current timecode of the captured video and assign Anchor Point metadata.

9. Machine Learning Assisted Anchor Point/Beat Generation

In one embodiment, a machine learning model may assist the user in generating Anchor Points or beats. When provided with multiple video files containing the same story beats, the user may select one of the video files and assign Anchor Points through metadata. The machine learning model would then analyze each Anchor Point's associated frame and frames surrounding and find matches within the remaining video files.

10. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 14:
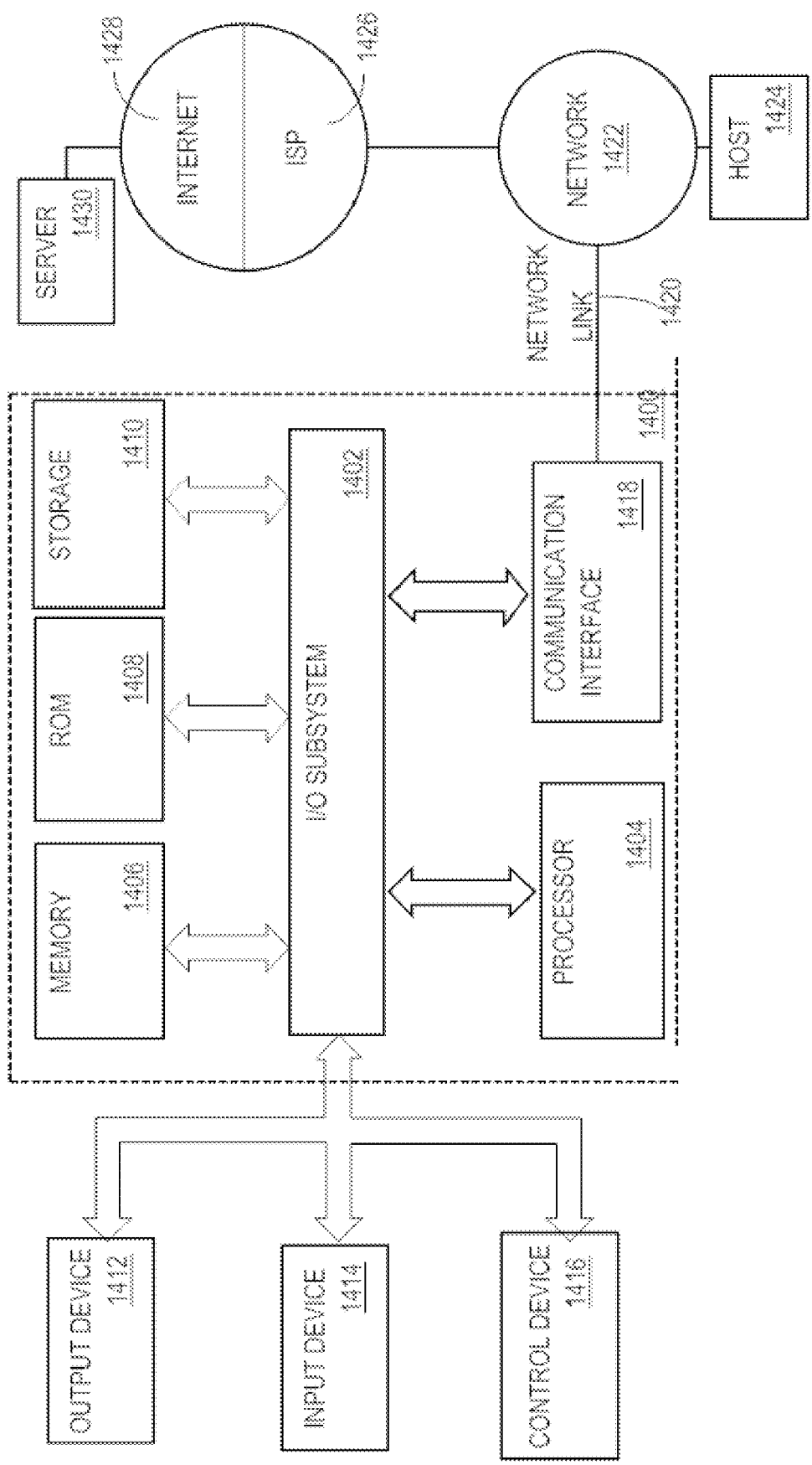
FIG. 14 is a block diagram that illustrates an example computer system with which an embodiment may be implemented.

FIG. 14 is a block diagram that illustrates an example computer system with which an embodiment may be implemented. In the example of FIG. 14, a computer system 1400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1400 includes an input/output (I/O) subsystem 1402 which may include a bus and/or other communication mechanism(s) for communicating information and/or instructions between the components of the computer system 1400 over electronic signal paths. The I/O subsystem 1402 may include an I/O controller, a memory controller and at least one I/O port. The electronic signal paths are represented schematically in the drawings, for example as lines, unidirectional arrows, or bidirectional arrows.

At least one hardware processor 1404 is coupled to I/O subsystem 1402 for processing information and instructions. Hardware processor 1404 may include, for example, a general-purpose microprocessor or microcontroller and/or a special-purpose microprocessor such as an embedded system or a graphics processing unit (GPU) or a digital signal processor or ARM processor. Processor 1404 may comprise an integrated arithmetic logic unit (ALU) or may be coupled to a separate ALU.

Computer system 1400 includes one or more units of memory 1406, such as a main memory, which is coupled to I/O subsystem 1402 for electronically digitally storing data and instructions to be executed by processor 1404. Memory 1406 may include volatile memory such as various forms of random-access memory (RAM) or other dynamic storage device. Memory 1406 also may be used for storing temporary variables or other intermediate information during execution of instructions to be executed by processor 1404. Such instructions, when stored in non-transitory computer-readable storage media accessible to processor 1404, can render computer system 1400 into a special-purpose machine that is customized to perform the operations specified in the instructions.

Computer system 1400 further includes non-volatile memory such as read only memory (ROM) 1408 or other static storage device coupled to I/O subsystem 1402 for storing information and instructions for processor 1404. The ROM 1408 may include various forms of programmable ROM (PROM) such as erasable PROM (EPROM) or electrically erasable PROM (EEPROM). A unit of persistent storage 1410 may include various forms of non-volatile RAM (NVRAM), such as FLASH memory, or solid-state storage, magnetic disk or optical disk such as CD-ROM or DVD-ROM, and may be coupled to I/O subsystem 1402 for storing information and instructions. Storage 1410 is an example of a non-transitory computer-readable medium that may be used to store instructions and data which when executed by the processor 1404 cause performing computer-implemented methods to execute the techniques herein.

The instructions in memory 1406, ROM 1408 or storage 1410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1400 may be coupled via I/O subsystem 1402 to at least one output device 1412. In one embodiment, output device 1412 is a digital computer display. Examples of a display that may be used in various embodiments include a touch screen display or a light-emitting diode (LED) display or a liquid crystal display (LCD) or an e-paper display. Computer system 1400 may include other type(s) of output devices 1412, alternatively or in addition to a display device. Examples of other output devices 1412 include printers, ticket printers, plotters, projectors, sound cards or video cards, speakers, buzzers or piezoelectric devices or other audible devices, lamps or LED or LCD indicators, haptic devices, actuators or servos.

At least one input device 1414 is coupled to I/O subsystem 1402 for communicating signals, data, command selections or gestures to processor 1404. Examples of input devices 1414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1416, which may perform cursor control or other automated control functions such as navigation in a graphical interface on a display screen, alternatively or in addition to input functions. Control device 1416 may be a touchpad, a mouse, a trackball, or cursor direction keys for communicating direction information and command selections to processor 1404 and for controlling cursor movement on display 1412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1414 may include a combination of multiple different input devices, such as a video camera and a depth sensor.

In another embodiment, computer system 1400 may comprise an internet of things (IoT) device in which one or more of the output device 1412, input device 1414, and control device 1416 are omitted. Or, in such an embodiment, the input device 1414 may comprise one or more cameras, motion detectors, thermometers, microphones, seismic detectors, other sensors or detectors, measurement devices or encoders and the output device 1412 may comprise a special-purpose display such as a single-line LED or LCD display, one or more indicators, a display panel, a meter, a valve, a solenoid, an actuator or a servo.

When computer system 1400 is a mobile computing device, input device 1414 may comprise a global positioning system (GPS) receiver coupled to a GPS module that is capable of triangulating to a plurality of GPS satellites, determining and generating geo-location or position data such as latitude-longitude values for a geophysical location of the computer system 1400. Output device 1412 may include hardware, software, firmware and interfaces for generating position reporting packets, notifications, pulse or heartbeat signals, or other recurring data transmissions that specify a position of the computer system 1400, alone or in combination with other application-specific data, directed toward host 1424 or server 1430.

Computer system 1400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1400 in response to processor 1404 executing at least one sequence of at least one instruction contained in main memory 1406. Such instructions may be read into main memory 1406 from another storage medium, such as storage 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1410. Volatile media includes dynamic memory, such as memory 1406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1402. Transmission media can also take the form of acoustic or light waves, such as those generated during radio-wave and infra-red data communications.

Various forms of media may be involved in carrying at least one sequence of at least one instruction to processor 1404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1400 can receive the data on the communication link and convert the data to a format that can be read by computer system 1400. For instance, a receiver such as a radio frequency antenna or an infrared detector can receive the data carried in a wireless or optical signal and appropriate circuitry can provide the data to I/O subsystem 1402 such as place the data on a bus. I/O subsystem 1402 carries the data to memory 1406, from which processor 1404 retrieves and executes the instructions. The instructions received by memory 1406 may optionally be stored on storage 1410 either before or after execution by processor 1404.

Computer system 1400 also includes a communication interface 1418 coupled to bus 1402. Communication interface 1418 provides a two-way data communication coupling to network link(s) 1420 that are directly or indirectly connected to at least one communication networks, such as a network 1422 or a public or private cloud on the Internet. For example, communication interface 1418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1422 broadly represents a local area network (LAN), wide-area network (WAN), campus network, internetwork or any combination thereof. Communication interface 1418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1418 sends and receives electrical, electromagnetic or optical signals over signal paths that carry digital data streams representing various types of information.

Network link 1420 typically provides electrical, electromagnetic, or optical data communication directly or through at least one network to other data devices, using, for example, satellite, cellular, Wi-Fi, or BLUETOOTH technology. For example, network link 1420 may provide a connection through a network 1422 to a host computer 1424.

Furthermore, network link 1420 may provide a connection through network 1422 or to other computing devices via internetworking devices and/or computers that are operated by an Internet Service Provider (ISP) 1426. ISP 1426 provides data communication services through a world-wide packet data communication network represented as internet 1428. A server computer 1430 may be coupled to internet 1428. Server 1430 broadly represents any computer, data center, virtual machine or virtual computing instance with or without a hypervisor, or computer executing a containerized program system such as DOCKER or KUBERNETES. Server 1430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1400 and server 1430 may form elements of a distributed computing system that includes other computers, a processing cluster, server farm or other organization of computers that cooperate to perform tasks or execute applications or services. Server 1430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1430 may comprise a web application server that hosts a presentation layer, application layer and data storage layer such as a relational database system using structured query language (SQL) or no SQL, an object store, a graph database, a flat file system or other data storage.

Computer system 1400 can send messages and receive data and instructions, including program code, through the network(s), network link 1420 and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage 1410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1404. While each processor 1404 or core of the processor executes a single task at a time, computer system 1400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
one or more processors;
a memory storing instructions which, when executed by the one or more processors, causes performance of:
receiving computer input dividing a digital experience into a series of beats;
receiving a plurality of digital media files;
receiving metadata for a first digital media file of the plurality of digital media files identifying a first Anchor Point in the first digital media file, the first Anchor Point comprising a first identifier and a first timing in the first digital media file;
receiving metadata for a second digital media file of the plurality of digital media files identifying a second Anchor Point in the second digital media file, the second Anchor Point comprising a second identifier and a second timing in the second digital media file;
identifying segments of the plurality of digital media files that correspond to the series of beats and storing data associating the segments of the plurality of digital media files with corresponding beats of the series of beats;
generating and playing digital media according to digital instructions defining playback of the series of beats, generating and playing the digital media comprising:
while playing the first digital media file at a first playback timing, identifying the first Anchor Point and a first offset from the first timing of the first Anchor Point;
determining that the second identifier of the second Anchor Point corresponds to the first identifier of the first Anchor Point;
determining a second offset from the second timing of the second Anchor Point based, at least in part, on the first offset from the first timing of the first Anchor point and, using the second offset, determining a second playback timing in the second digital media file;
transitioning from playing the first digital media file at the first playback timing to playing the second digital media file at the second playback timing.

2. The system of claim 1, wherein the instructions, when executed by the one or more processors, further cause performance of:
storing data identifying a plurality of IN and OUT points by timecode for the plurality of digital media files;
creating and storing an association between a particular beat and all occurrences of that particular beat within the plurality of digital media files identified, wherein creating and storing the association comprises storing data identifying a plurality of IN and OUT points of the plurality of digital media files as corresponding to the particular beat.

3. The system of claim 1, wherein the plurality of digital media files comprises any of digital motion picture footage, digital video, sound, music, three-dimensional animation, games, three dimensional models, advertising, streaming media, or text.

4. The system of claim 1, wherein each beat of the series of beats comprise one or more of interactive logic or directionality instructions that define how the beat should be played and what beat should follow.

5. The system of claim 1, wherein the instructions, when executed by the one or more processors, further cause performance of:

creating and storing a nodal network comprising a plurality of nodes each representing story beats;

receiving input editing one or more parameters of one or more nodes of the nodal network and, in response, modifying one or more parameters of the one or more nodes; and exporting the nodal network as a stand-alone application, a spreadsheet, or an EDL for integration into traditional video-editing software.

6. The system of claim 5, wherein the instructions, when executed by the one or more processors, further cause performance of:

using the nodal network, creating references to the segments of the plurality of digital media files;

determine one or more editing patterns;

providing, to a client computing device, a graphical user interface for interactions causing branching operations and custom functionality, creating and referencing script segments, creating display effects, and adjusting audio through additional audio controls.

7. The system of claim 5, wherein the instructions, when executed by the one or more processors, further cause performance of providing a player that interprets the nodal network to reproduce playback and display of scripts, storyboards, video, user interfaces, and audio.

8. The system of claim 1, wherein the instructions, when executed by the one or more processors, further cause performance of creating and storing metadata comprising media names paired with tags and values which when interpreted cause calculation of playback timing for designated media and playback of the designated media at the playback timing and an execution of functionality at a particular OUT point.

9. The system of claim 1, wherein the instructions, when executed by the one or more processors, further cause performance of:

receiving computer input editing or modifying parameters of a particular beat of the series of beats, including one or more of adding and adjusting sound, video, music, real-time animation, rendering, or interactivity;

wherein generating and playing the digital media further comprises playing a particular segment of the plurality of digital media files that corresponds to the particular beat according to the input editing or modifying the parameters of the particular beat.

10. A computer-implemented method comprising:

receiving computer input dividing a digital experience into a series of beats;

receiving a plurality of digital media files;

receiving metadata for a first digital media file of the plurality of digital media files identifying a first Anchor Point in the first digital media file, the first Anchor Point comprising a first identifier and a first timing in the first digital media file;

receiving metadata for a second digital media file of the plurality of digital media files identifying a second Anchor Point in the second digital media file, the second Anchor Point comprising a second identifier and a second timing in the second digital media file;

identifying segments of the plurality of digital media files that correspond to the the series of beats and storing data associating the segments of the plurality of digital media files with corresponding beats of the series of beats;

generating and playing digital media according to digital instructions defining playback of the series of beats, generating and playing the digital media comprising:

while playing the first digital media file at a first playback timing, identifying the first Anchor Point and a first offset from the first timing of the first Anchor Point;

determining that the second identifier of the second Anchor Point corresponds to the first identifier of the first Anchor Point;

determining a second offset from the second timing of the second Anchor Point based, at least in part, on the first offset from the first timing of the first Anchor point and, using the second offset, determining a second playback timing in the second digital media file;

transitioning from playing the first digital media file at the first playback timing to playing the second digital media file at the second playback timing.

11. The computer-implemented method of claim 10, further comprising:

storing data identifying a plurality of IN and OUT points by timecode for the plurality of digital media files;

creating and storing an association between a particular beat and all occurrences of that particular beat within the plurality of digital media files identified, wherein creating and storing the association comprises storing data identifying a plurality of IN and OUT points of the plurality of digital media files as corresponding to the particular beat.

12. The computer-implemented method of claim 10, wherein the plurality of digital media files comprises any of digital motion picture footage, digital video, sound, music, three-dimensional animation, games, three dimensional models, advertising, streaming media, or text.

13. The computer-implemented method of claim 10, wherein each beat of the series of beats comprise one or more of interactive logic or directionality instructions that define how the beat should be played and what beat should follow.

14. The computer-implemented method of claim 10, further comprising:

creating and storing a nodal network comprising a plurality of nodes each representing story beats;

receiving input editing one or more parameters of one or more nodes of the nodal network and, in response, modifying one or more parameters of the one or more nodes; and exporting the nodal network as a stand-alone application, a spreadsheet, or an EDL for integration into traditional video-editing software.

15. The computer-implemented method of claim 14, further comprising:

using the nodal network, creating references to the plurality of digital media files;

determine one or more editing patterns;

providing, to a client computing device, a graphical user interface for interactions causing branching operations and custom functionality, creating and referencing script segments, creating display effects, and adjusting audio through additional audio controls.

16. The computer-implemented method of claim 14, further comprising providing a player that interprets the nodal network to reproduce playback and display of scripts, storyboards, video, user interfaces, and audio.

17. The computer-implemented method of claim 10, further comprising creating and storing metadata comprising media names paired with tags and values which when interpreted cause calculation of playback timing for designated media and playback of the designated media at the playback timing and an execution of functionality at a particular OUT point.

18. The computer-implemented method of claim 10, further comprising:
receiving computer input editing or modifying parameters of a particular beat of the series of beats, including one or more of adding and adjusting sound, video, music, real-time animation, rendering, or interactivity;
receiving computer input replacing a first segment of the plurality of digital media files corresponding to the particular beat with a second segment of the plurality of digital media files;
generating and playing second digital media according to digital instructions defining playback of the series of beats, wherein the second digital media comprises the second segment and the computer input editing or modifying the parameters of the particular beat is automatically applied to the second segment.

19. The method of claim 11, further comprising:
receiving computer input editing or modifying parameters of a particular beat of the series of beats, including one or more of adding and adjusting sound, video, music, real-time animation, rendering, or interactivity;
wherein generating and playing the digital media further comprises playing a particular segment of the plurality of digital media files that corresponds to the particular beat according to the input editing or modifying the parameters of the particular beat.

20. One or more non-transitory computer-readable media storing instructions which, when executed by one or more processors, causes performance of:
receiving computer input dividing a digital experience into a series of beats;
receiving a plurality of digital media files;
receiving metadata for a first digital media file of the plurality of digital media files identifying a first Anchor Point in the first digital media file, the first Anchor Point comprising a first identifier and a first timing in the first digital media file;
receiving metadata for a second digital media file of the plurality of digital media files identifying a second Anchor Point in the second digital media file, the second Anchor Point comprising a second identifier and a second timing in the second digital media file;
identifying segments of the plurality of digital media files that correspond to the the series of beats and storing data associating the segments of the plurality of digital media files with corresponding beats of the series of beats;
generating and playing digital media according to digital instructions defining playback of the series of beats, generating and playing the digital media comprising:
while playing the first digital media file at a first playback timing, identifying the first Anchor Point and a first offset from the first timing of the first Anchor Point;
determining that the second identifier of the second Anchor Point corresponds to the first identifier of the first Anchor Point;
determining a second offset from the second timing of the second Anchor Point based, at least in part, on the first offset from the first timing of the first Anchor point and, using the second offset, determining a second playback timing in the second digital media file;
transitioning from playing the first digital media file at the first playback timing to playing the second digital media file at the second playback timing.

* * * * *

UNITED STATES PATENT AND TRADEMARK OFFICE
CERTIFICATE OF CORRECTION

PATENT NO. : 11,082,755 B2  
APPLICATION NO. : 17/024122  
DATED : August 3, 2021  
INVENTOR(S) : Kunsberg Page 1 of 1

It is certified that error appears in the above-identified patent and that said Letters Patent is hereby corrected as shown below:

In the Claims

Claim 10, Column 20, Line 2, Delete the first occurrence of "the"

Claim 20, Column 22, Line 15, Delete the first occurrence of "the"

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*